United States Patent [19]
Koshikawa et al.

[11] Patent Number: 5,995,339
[45] Date of Patent: *Nov. 30, 1999

[54] MAGNETORESISTIVE HEAD WITH A FRONT FLUX GUIDE AND AN EMBEDDED MR ELEMENT

[75] Inventors: Takao Koshikawa; Yoshinori Ohtsuka; Yuji Uehara; Junzo Toda; Yoshifumi Mizoshita, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/791,015

[22] Filed: Jan. 27, 1997

Related U.S. Application Data

[63] Continuation of application No. 08/395,573, Feb. 28, 1995, abandoned, which is a continuation-in-part of application No. 08/189,698, Feb. 1, 1994, abandoned.

[30] Foreign Application Priority Data

| Mar. 18, 1993 | [JP] | Japan | 5-57602 |
| Dec. 2, 1993 | [JP] | Japan | 5-302637 |
| Dec. 13, 1994 | [JP] | Japan | 6-309051 |

[51] Int. Cl.$^6$ ................................................. G11B 5/39
[52] U.S. Cl. ....................................................... 360/113
[58] Field of Search ........................... 360/110, 113, 360/122, 124, 126; 29/603, 603.01, 603.07; 324/252; 365/8, 157, 158

[56] References Cited

U.S. PATENT DOCUMENTS

| 4,291,351 | 9/1981 | Pennell et al. | 360/113 |
| 4,803,580 | 2/1989 | Mowry | 360/113 |
| 4,803,581 | 2/1989 | Kira et al. | 360/113 |
| 4,843,505 | 6/1989 | Mowry | 360/113 |
| 5,032,945 | 7/1991 | Argyle et al. | 360/126 |
| 5,164,869 | 11/1992 | Fontana, Jr. et al. | 360/126 |
| 5,193,039 | 3/1993 | Smith et al. | 360/113 |
| 5,241,439 | 8/1993 | Michalek et al. | 360/113 |
| 5,583,726 | 12/1996 | Mizoshita et al. | 360/113 |

FOREIGN PATENT DOCUMENTS

| 0061363 | 9/1982 | European Pat. Off. . |
| 0114997 | 8/1984 | European Pat. Off. . |
| 0301823 | 2/1989 | European Pat. Off. . |
| 0411914 | 2/1991 | European Pat. Off. . |
| 0534791 | 3/1993 | European Pat. Off. . |
| 59-221824 | 12/1984 | Japan . |

(List continued on next page.)

OTHER PUBLICATIONS

IMB Technical Disclosure Bulletin, vol. 26, No. 7A, Dec. 1983, Armonk, N.Y., US, pp. 3127–3128, XP002020507 D.L. BEAM ET AL. : "Self–aligned two–step process for flux enhancement in magnetoresistive sensors".
IEEE Transactions on Magnetics, "Super–Narrow Track MR Head"Kanai et al, vol. Mag.–11, No. 5, Sept. 1975, p. 1212.
IEEE Transactions on Magnetics, "Study of Recessed MR Sensors . . . " Tsang et al, vol.28, No. 5, Sept. 1992, p. 2289.
IBM Technical Disclosure Bulletin, "Magnetic Head with Offset MR Stripe", Decker et al, vol.23, No. 5, Oct. 1980.

*Primary Examiner*—David L. Ometz
*Attorney, Agent, or Firm*—Greer, Burns & Crain, Ltd.

[57] ABSTRACT

A magnetoresistive head includes a magnetoresistive element set back from the front end face of the head confronting a record medium for converting changes in a signal magnetic field leaking out from the record track of the record medium into changes in resistance. The magnetoresistive element is connected to a pair of terminals and a sense region is defined between both the terminals. The magnetoresistive element is magnetically coupled to a front flux guide, one end of which is exposed in the front end face of the head, at the other end of the same. The front flux guide is virtually in the form of a rectangle elongated in the direction of the width of the record track of the record medium so as to exceed the sense region of the magnetoresistive element.

15 Claims, 21 Drawing Sheets

FOREIGN PATENT DOCUMENTS

| | | |
|---|---|---|
| 60-136018 | 7/1985 | Japan . |
| 61-258320 | 11/1986 | Japan . |
| 61-258321 | 11/1986 | Japan . |
| 63-091818 | 4/1988 | Japan . |
| 63-241713 | 10/1988 | Japan . |
| 4087011 | 3/1992 | Japan . |
| 5-114119 | 7/1993 | Japan . |
| 9308562 | 4/1993 | WIPO . |

FIG. IA
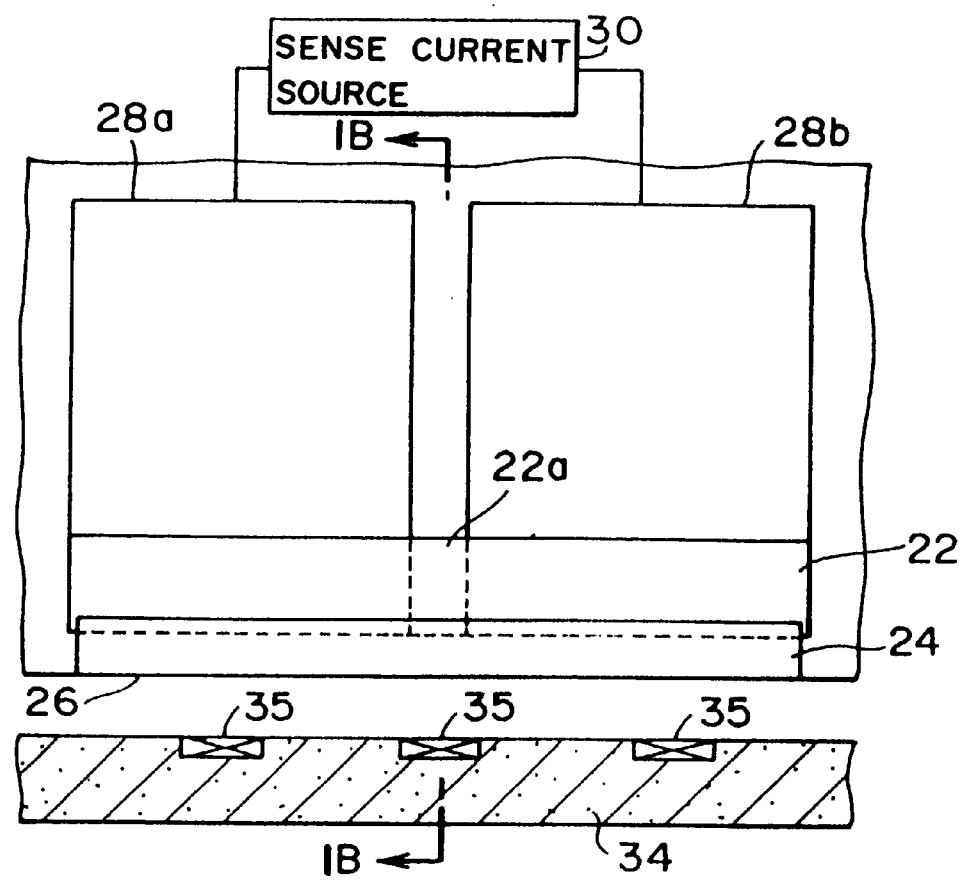
FIG. IB
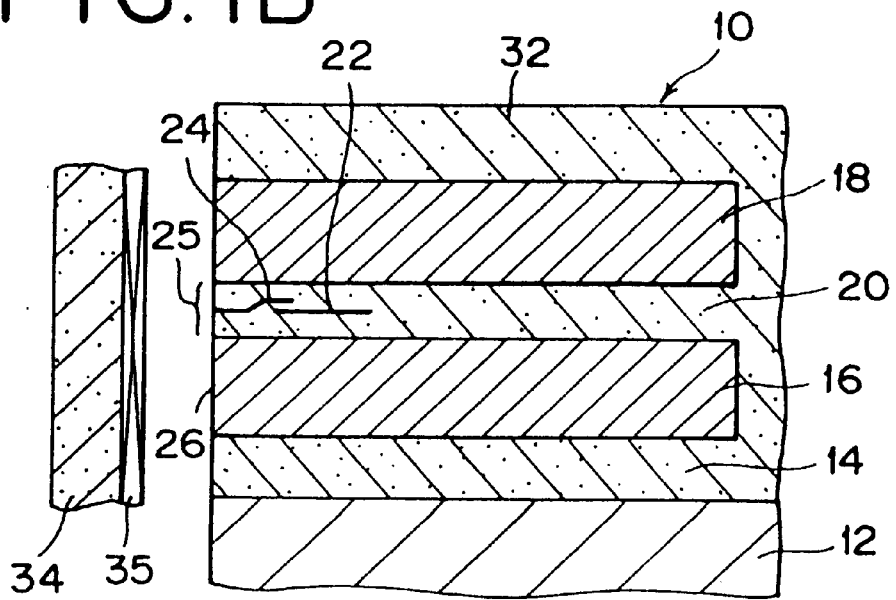

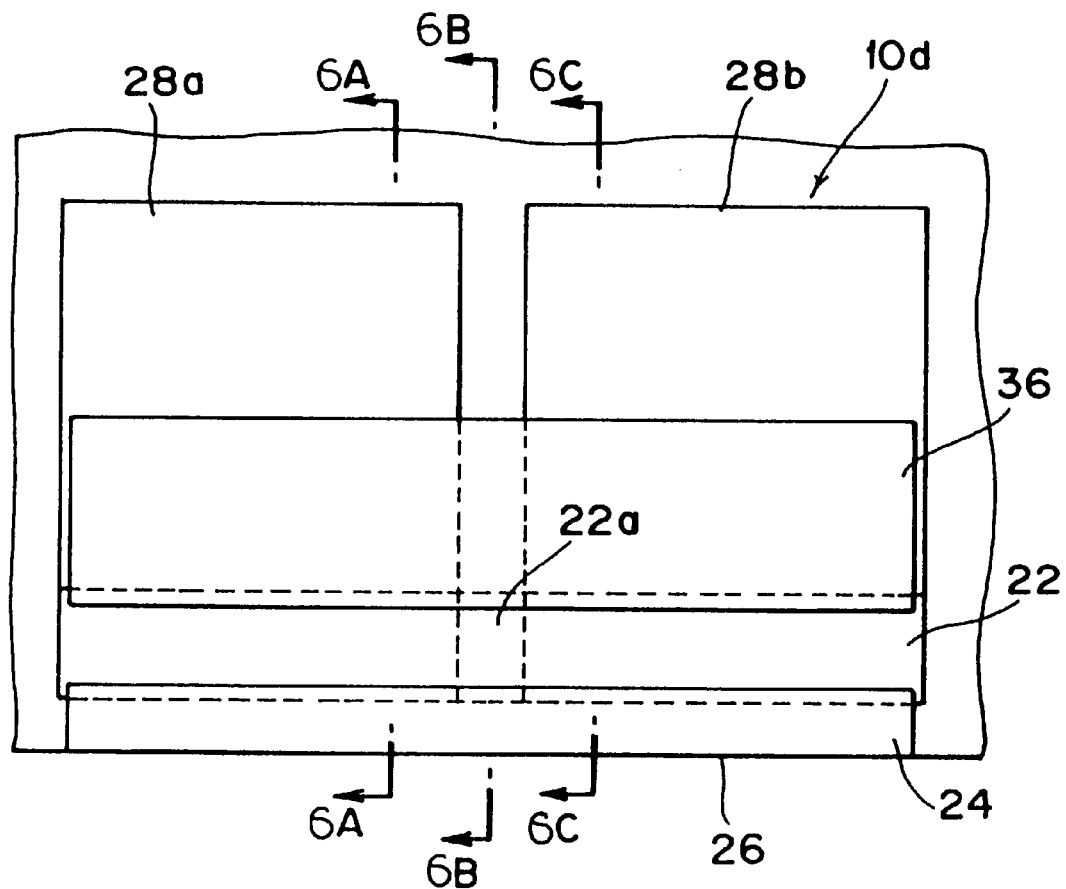

MAGNETORESISTIVE HEAD WITH A FRONT FLUX GUIDE AND AN EMBEDDED MR ELEMENT

CROSS REFERENCE TO RELATED APPLICATION

This application is a continuation of application Ser. No. 08/395,573 filed on Feb. 28, 1995, now abandoned which is a continuation-in-part of application Ser. No. 08/189,698, filed on Feb. 1, 1994, now abandoned.

BACKGROUND OF THE INVENTION

1. Field of the Invention

The present invention relates to a thin-film magnetic head for use in magnetic recording and reproducing apparatus such as magnetic disk apparatus and magnetic tape apparatus and, more particularly, relates to a magnetoresistive head for reproducing recorded information on a record medium by the magnetoresistive effect.

2. Description of the Related Art

Recently, with the advancement in magnetic disk apparatus having smaller sizes and increased recording density, there are demands for implementation of contact recording/reproduction during which the head slider has a reduced flying height, i.e., the slider floats slightly above a record medium or the slider contacts the record medium.

When the velocity of a magnetic disk relative velocity to the head is decreased as the diameter of a magnetic disk is reduced, a conventional magnetic inductive head reproduces a deteriorated output. Therefore, a magnetoresistive head (hereinafter briefly referred to as "MR head") which reproduces an output not dependent on the velocity and provides a high power output even when the disk is rotated at low velocity is desired to be developed.

An MR head supplies a constant sense current to a magnetoresistive element to convert changes in magnitude of a signal magnetic field leaked out from the record track of a record medium into changes in resistance and thereby reproduces information recorded on the record medium as changes in voltage. In conventional MR heads, a magnetoresistive element has been exposed on the surface of the head confronting the medium. Therefore, the recording and reproducing through very low flying height or contacting have been very difficult to realize while using a combination of such a head and a metallic record medium because of a short or discharge occurring in between.

Accordingly, the present inventors proposed in Japanese Laid-open Patent Publication No. Hei 5-114119 a flux-guided type magnetoresistive head in such an arrangement that the magnetoresistive element is not exposed on the surface of the head confronting the medium, and a leakage magnetic field from the medium is guided by a flux guide formed of a soft magnetic material to the magnetoresistive element.

The MR head disclosed in the above laid-open patent publication includes a magnetoresistive element of Ni-Fe set back from the front end face of the head confronting a record medium. The magnetoresistive element is provided with a pair of terminals which define a sense region of the magnetoresistive element therebetween, and a constant sense current is adapted to be supplied from one terminal to the other. The MR head further includes a flux guide having one end thereof exposed in the front end face of the head and the other end magnetically coupled to one end of the magnetoresistive element for guiding a magnetic flux from the record medium to the magnetoresistive element.

The flux guide, magnetoresistive element, and terminals are embedded in a nonmagnetic insulating layer and, upper and lower magnetic shields sandwich the nonmagnetic insulating layer. Further, there is defined a gap between the upper and lower magnetic shields for receiving the magnetic flux from the record medium in the front end face of the head.

The sense region of the magnetoresistive element, defined by the pair of terminals, is formed to be larger than the width of the record track on the record medium. The flux guide has, in its plan view, a trapezoidal form, a home plate form, a triangular form, and the like and arranged to be smaller in width than the sense region of the magnetoresistive element.

In the prior art flux guide type MR head, disclosed in the above laid-open patent publication it has been difficult to control magnetic domains because a flux guide smaller in width is used, it has been difficult to control magnetic domains. Consequently, there has been a problem that the reproduced output and reproduced waveform by the magnetoresistive element tend to vary by the multi-domain activities of the flux guide itself.

The above mentioned problem will be described below in detail with reference to FIG. 29. The magnetoresistive element 2 is magnetically coupled to one end of each of a front flux guide 3 and a back flux guide 4. Since the front flux guide 3 is restricted in its length L (a longer length L makes passage of a signal magnetic field Φ difficult), the front flux guide 3 has a form whose length L and width $W_1$ are virtually equal, i.e., a form close to a square.

Accordingly, the easy axis of magnetization, not shown, becomes unstable, and the signal magnetic field Φ incoming in the direction of the arrow in the diagram from the record track of a medium circulates as indicated by the arrows in the diagram in the front flux guide 3 and back flux guide 4 and, thereby, circulating magnetic domains partitioned by magnetic walls 5 are formed in each flux guide.

The phenomenon producing a plurality of circulating magnetic domains partitioned by magnetic walls 5 is called a multiple magnetic domain structure. A magnetic domain structure in which the direction of magnetization is aligned with a definite direction, and no magnetic wall is formed, is called a single magnetic domain structure. Magnetic walls, when applied with an external magnetic field, move to minimize the magnetostatic energy. However, it becomes difficult for the magnetic wall 5 to smoothly move when there are pin holes, projections and the like in the front and rear flux guides 3 and 4, and this causes noise.

Thus, in the MR head disclosed in the above laid-open patent publication, the easy axis of magnetization of the flux guide is unstable. Therefore, a multiple magnetic domain structure is produced in the flux guide and, hence, its response to the signal magnetic field Φ from the record medium becomes unstable. As a result, there has been such a difficulty that noises are mixed in the reproduced signal.

SUMMARY OF THE INVENTION

It is therefore an object of the present invention to provide a magnetoresistive head in which the above described problems in the prior art are solved and from which stabilized reproduced output and reproduced waveform can be obtained.

Another object of the present invention is to provide a magnetoresistive head in which occurrence of side crosstalk during the reproduction is restricted.

In accordance with a first aspect of the present invention, there is provided a magnetoresistive head for reproducing information recorded on a record medium, comprising: a magnetoresistive element set back from the front end face of the head confronting the record medium for converting a signal magnetic field leaking out from a record track of a record medium, into changes in resistance, a pair of terminals connected to the magnetoresistive element, and defining a sense region of the magnetoresistive element therebetween, and a front flux guide, one end thereof being exposed in the front end face of the head, and the other end thereof being magnetically coupled to one end of the magnetoresistive element, for guiding magnetic flux from the record medium to the magnetoresistive element. The front flux guide is shaped virtually in the form of a rectangle elongated in the direction of the width of the record track of the record medium so as to exceed the sense region of the magnetoresistive element and the direction of the easy axis of magnetization of the front flux guide is parallel to the direction of the width of the record track.

Preferably, the magnetoresistive head further comprises a back flux guide, one end thereof being magnetically coupled to the other end of the magnetoresistive element. The back flux guide is shaped virtually in the form of a rectangle elongated in the direction of the width of the record track of the record medium, so as to exceed the sense region of the magnetoresistive element. The direction of the easy axis of magnetization of the back flux guide is parallel to the direction of the width of the record track.

Still preferably, magnetic films selected from a group consisting of an antiferromagnetic film, a permanent magnet film, and a ferrimagnetic film are deposited over the surfaces of the front flux guide and the back flux guide. The width of the sense region of the magnetoresistive element is desired to be smaller than the width of the record track.

In accordance with a second aspect of the present invention, there is provided a magnetoresistive head for reproducing information recorded on a record medium comprising a magnetoresistive element, set back from the front end face of the head confronting the record medium, for converting a signal magnetic field leaking out from a record track of the record medium into changes in resistance, a pair of terminals connected to the magnetoresistive element and defining a sense region of the magnetoresistive element therebetween, a front flux guide for guiding magnetic flux from the record medium to magnetoresistive element, one end thereof being exposed in the front end face of the head, and the other end thereof being magnetically coupled to one end of the magnetoresistive element and a return yoke for returning magnetic flux pass through the magnetoresistive element to the record medium, magnetically coupled to the other end of the magnetoresistive element in which the front flux guide is shaped virtually in the form of a rectangle elongated in the direction of the width of the record track of the record medium so as to exceed the sense region of the magnetoresistive element and the direction of the easy axis of magnetization of the front flux guide is parallel to the direction of the width of the record track.

In accordance with a third aspect of the present invention, there is provided a magnetoresistive head for reproducing information recorded on a record medium, comprising: a magnetoresistive element set back from the front end face of the head confronting the record medium for converting a signal magnetic field leaking out from a record track of the record medium into changes in resistance, a pair of terminals connected to the magnetoresistive element and defining a sense region of the magnetoresistive element therebetween, a front flux guide one end thereof being exposed in the front end face of the head and the other end thereof being magnetically coupled to one end of the magnetoresistive element for guiding magnetic flux from the record medium to the magnetoresistive element, and a pair of magnetic films disposed on both sides of the front flux guide and lying along the magnetoresistive element.

According to the first and second aspects of the invention, by shaping the flux guide in its plan view in the form of a rectangle elongated in the direction of the width of the record track, it is made possible to stabilize the direction of the easy axis of magnetization of the flux guide and prevent occurrence of variations in the reproduced output and reproduced waveform. Further, by forming the width of the sense region of the magnetoresistive element smaller than the record track, occurrence of side crosstalk during the reproduction can be prevented.

According to the third aspect of the invention, by arranging a pair of magnetic films on both sides of the front flux guide along the magnetoresistive element, it is made possible to have the easy axis of magnetization of the front flux guide aligned with the direction parallel to the width of the record track to thereby prevent occurrence of circulating magnetic domains.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1A is a schematic plan view of a first embodiment of the invention;

FIG. 1B is a sectional view taken along line B—B of FIG. 1A;

FIG. 5 is a plan view of a fifth embodiment of the invention;

DESCRIPTION OF THE PREFERRED EMBODIMENTS

Figure 2A:
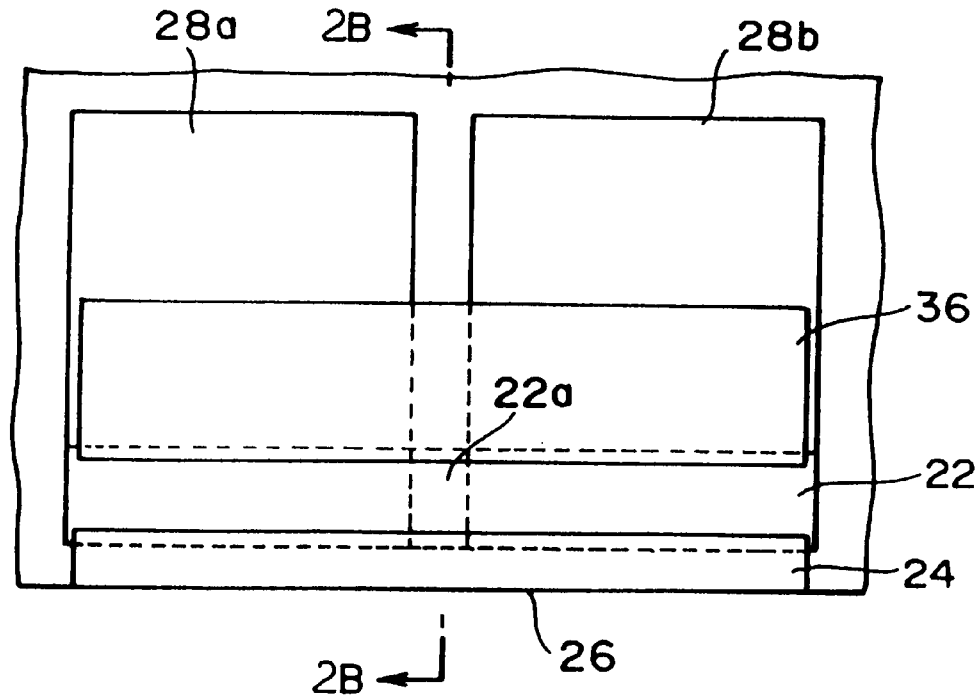
FIG. 2A is a schematic plan view of a second embodiment of the invention.

Embodiments of the invention will be described below in detail with reference to the accompanying drawings.

FIG. 1A shows a schematic plan view of an MR head 10 of a first embodiment of the invention and FIG. 1B shows a sectional view taken along line B—B of FIG. 1A. For example, on a conducting substrate 12 made of alumina-titanium carbide ($Al_2O_3$-TiC) is deposited an insulating layer 14 made for example of alumina ($Al_2O_3$). Reference numerals 16 and 18 denote a first and a second magnetic shield formed for example of nickel-iron (Ni-Fe) with a nonmagnetic insulating layer 20 made of alumina ($Al_2O_3$) interposed therebetween.

The first and second magnetic shields 16 and 18 define a gap 25 in the front end face (the face confronting a medium) 26 of the head 10 to improve the resolution in reproduction. Within the nonmagnetic insulating layer 20, there is embedded a magnetoresistive element 22 formed for example of nickel-iron (Ni-Fe) kept apart from the front end face 26 of the head 10.

Within the nonmagnetic insulating layer 20, there is further embedded a front flux guide 24 formed for example of nickel-iron (Ni-Fe), of which one end is exposed in the front end face 26 of the head 10 and the other end is magnetically coupled to one end of the magnetoresistive element 22. The front flux guide 24 guides the magnetic flux from the record medium 34 to the magnetoresistive element 22.

The front flux guide 24, as is made apparent by reference to FIG. 1A, is shaped in the form of a rectangle elongated sideways along the front edge of the magnetoresistive element 22. The distance between the front flux guide 24 and magnetoresistive element 22 overlapping with each other is for example around 0.05 to 0.2 $\mu$m.

The sense region 22a of the magnetoresistive element 22 is determined by the distance between a pair of terminals 28a and 28b and its width is formed to be smaller than the width of the record track 35 of the record medium 34. The terminals 28a and 28b are connected to a sense current source 30 and the magnetoresistive element 22 is supplied with a constant sense current from the sense current source 30. The terminals 28a and 28b are formed for example of Au, Cu, Al, and the like.

An insulating protecting film 32 made for example of alumina ($Al_2O_3$) is deposited over the second magnetic shield 18 to complete a magnetoresistive head 10. The head 10 is fabricated by the well known thin film process.

The signal magnetic flux from the record track 35 of the record medium 34 is applied to the head 10, guided along the front flux guide 24 to flow into the magnetoresistive element 22, and thereby the magnetoresistive element 22 is magnetized. The magnetic flux passing through the magnetoresistive element 22 is absorbed by the first and second magnetic shields 16 and 18.

The magnetoresistive element 22 changes its resistance value according to changes in the magnitude of the signal magnetic flux. Since a constant sense current from the sense current source 30 is supplied to the magnetoresistive element 22, the voltage between the terminals 28a and 28b changes with changes in the resistance value and, thereby, information recorded on the record medium 34 can be reproduced as a voltage signal.

In this embodiment, since the front flux guide 24 is shaped in the form of a rectangle elongated sideways so as to exceed the width of the sense region 22a and the record track 35, its easy axis of magnetization can be oriented to the direction parallel to the width of the record track 35 by virtue of the form and anisotropy of the front flux guide 24 and, thereby, a single magnetic domain structure can be realized easily.

Thus, variations in the magnetic domains of the front flux guide 24 can be prevented and, hence, variations in the reproduced output and reproduced waveform by the magnetoresistive element due to the variations in the magnetic domains can be prevented. Further, since the width of the sense region 22a of the magnetoresistive element 22 is formed to be smaller than the width of the record track 35, the side crosstalk from adjoining record tracks to the record track 35 to be reproduced can be effectively suppressed.

An MR head 10a of a second embodiment of the invention will be described below with reference to FIGS. 2A and 2B. In this embodiment and a number of embodiments to be described hereinafter, those component parts essentially the same as those in the first embodiment shown in FIGS. 1A and 1B will be denoted by like reference numerals and description of them will be omitted to avoid duplication.

The present embodiment is such that is obtained by adding a back flux guide 36 to the first embodiment shown in FIGS. 1A and 1B. The back flux guide 36 is formed of nickel-iron (Ni-Fe) like the front flux guide 24 and its one end is magnetically coupled to the magnetoresistive element 22. In this embodiment, by virtue of the additionally provided back flux guide 36, a meritorious effect, on top of the effects obtained from the above described first embodiment, can be obtained that the demagnetizing field of the magnetoresistive element 22 is suppressed and the reproducing efficiency is improved.

Figure 3:
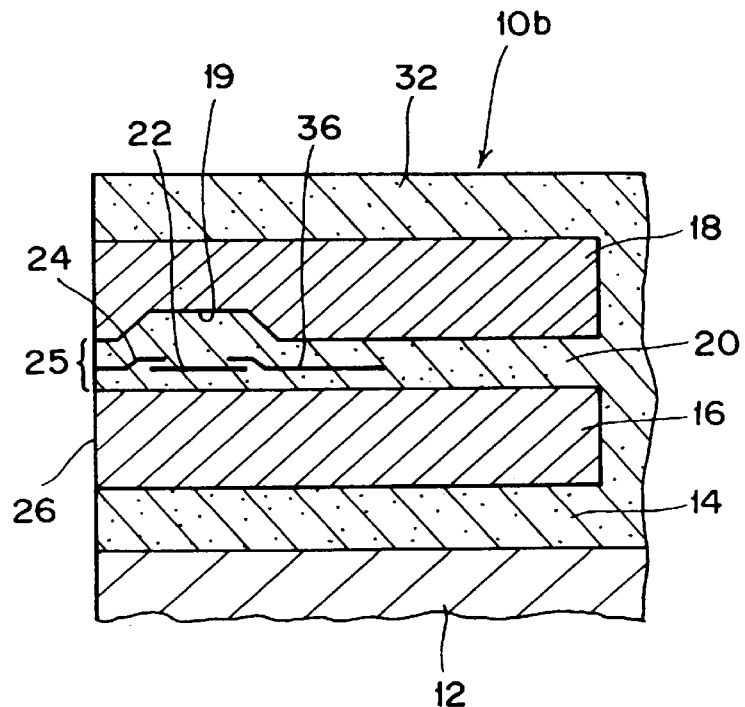
FIG. 3 is a sectional view of a third embodiment of the invention.

Referring to FIG. 3, there is shown a sectional view of an MR head 10b of a third embodiment of the invention. There is formed a recess 19 in the inner face of the second magnetic shield 18 confronting the magnetoresistive element 22 and the distance between the first and second magnetic shields 16 and 18 is enlarged at the portion around the magnetoresistive element 22. By virtue of the described arrangement, the magnetic flux from the magnetoresistive element 22 and the front and back flux guides 24 and 36 is suppressed from leaking out so that the reproducing efficiency can be improved.

Further, since the magnetoresistive element 22 is arranged to be closer to the first magnetic shield 16 than to the second magnetic shield 18, it is achieved to apply a magnetic bias, so-called self-bias, to the magnetoresistive element 22 by virtue of the magnetic fields from the first and second magnetic shields 16 and 18, which are magnetized by the magnetic field due to the sense current.

Figure 4:
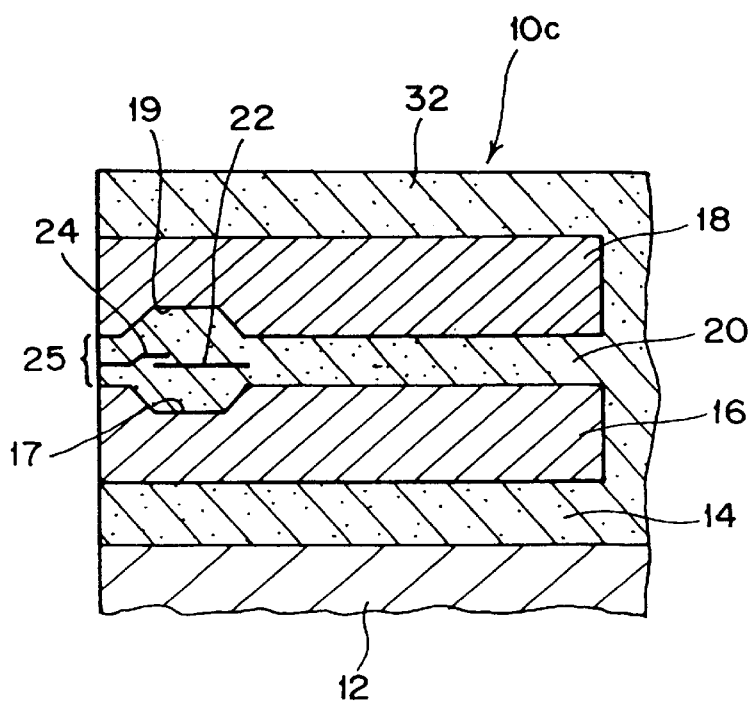
FIG. 4 is a sectional view of a fourth embodiment of the invention.

Referring to FIG. 4, there is shown a sectional view of an MR head 10c of a fourth embodiment of the invention. This embodiment is of such a configuration that the first and second magnetic shields 16 and 18 have recesses 17 and 19, formed at the portions where they confront the magnetoresistive element 22, respectively, and thereby the distance between the first and second magnetic shields 16 and 18 around the portion where they face to the magnetoresistive element 22 is made larger.

On the side opposite to the side where the magnetoresistive element 22 is coupled to the front flux guide 24, the distance between the first and second magnetic shields 16 and 18 is made smaller so that the magnetoresistive element 22 is coupled to the first and second magnetic shields 16 and 18.

Figure 6A:
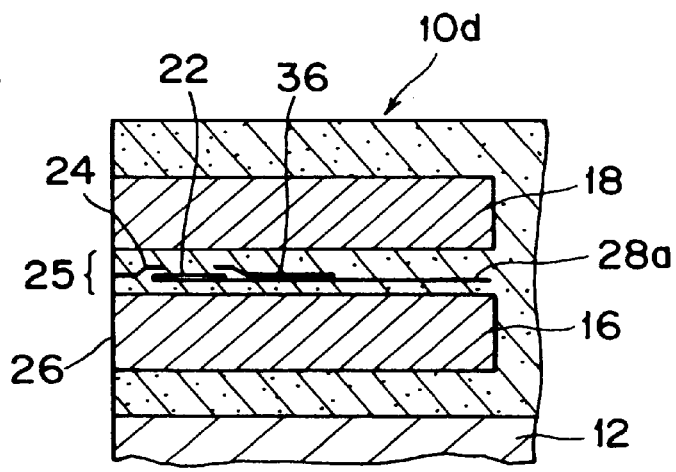
FIG. 6A is a sectional view taken along line A—A of FIG. 5.
Figure 6B:
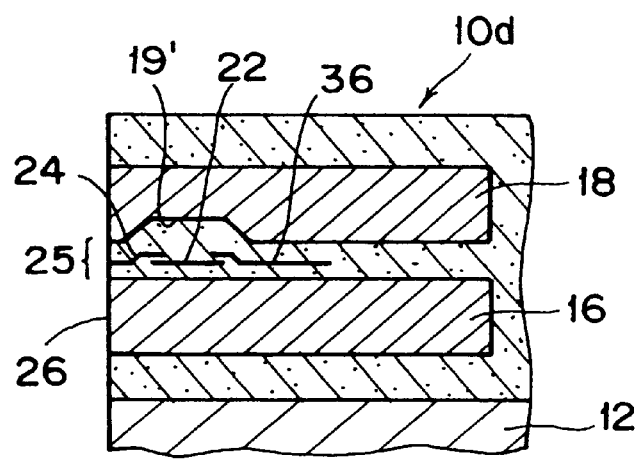
FIG. 6B is a sectional view taken along line B—B of FIG. 5.
Figure 6C:
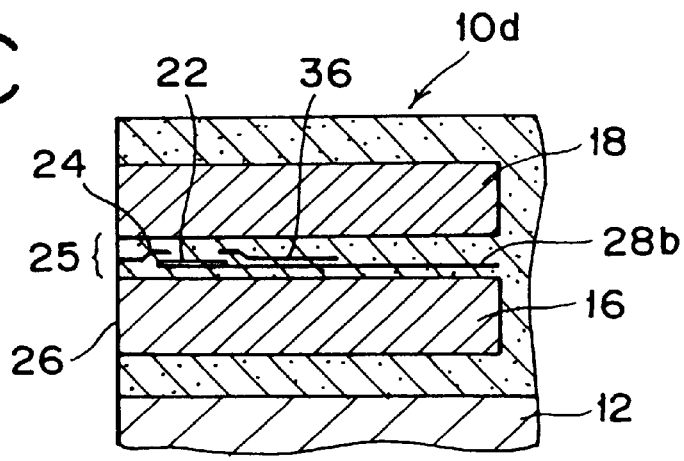
FIG. 6C is a sectional view taken along line C—C of FIG. 5.

Referring to FIG. 5 and FIGS. 6A to 6C, an MR head 10d of a fifth embodiment of the invention will be described. FIG. 5 is a schematic plan view of the MR head 10d of the fifth embodiment and FIGS. 6A, 6B and 6C are sectional views taken along lines A—A, B—B, and C—C of FIG. 5. This embodiment is arranged such that not only the distance between the first and second magnetic shields 16 and 18 is changed in the direction virtually vertical to the surface of the record medium 34 but also the distance between the first and second magnetic shields 16 and 18 is changed in the direction of the width of the record track 35.

More specifically, as shown in FIG. 6B, a recess 19' is formed in the inner face of the second magnetic shield 18 at the portion where it confronts the sense region 22a of the magnetoresistive element 22, so that the distance between the first and second magnetic shields 16 and 18 is made larger in the sense region 22a of the magnetoresistive element 22 and, as apparent from FIG. 6A and FIG. 6C, the distance between the shields is made smaller in the other portions.

Also in this embodiment, the self-bias for the magnetoresistive element 22 is provided as with the third embodiment of FIG. 3, and the effect to suppress side crosstalk is obtained because the distance between the first and second magnetic shields 16 and 18 is narrowed at other portions than the sense region.

Figure 7:
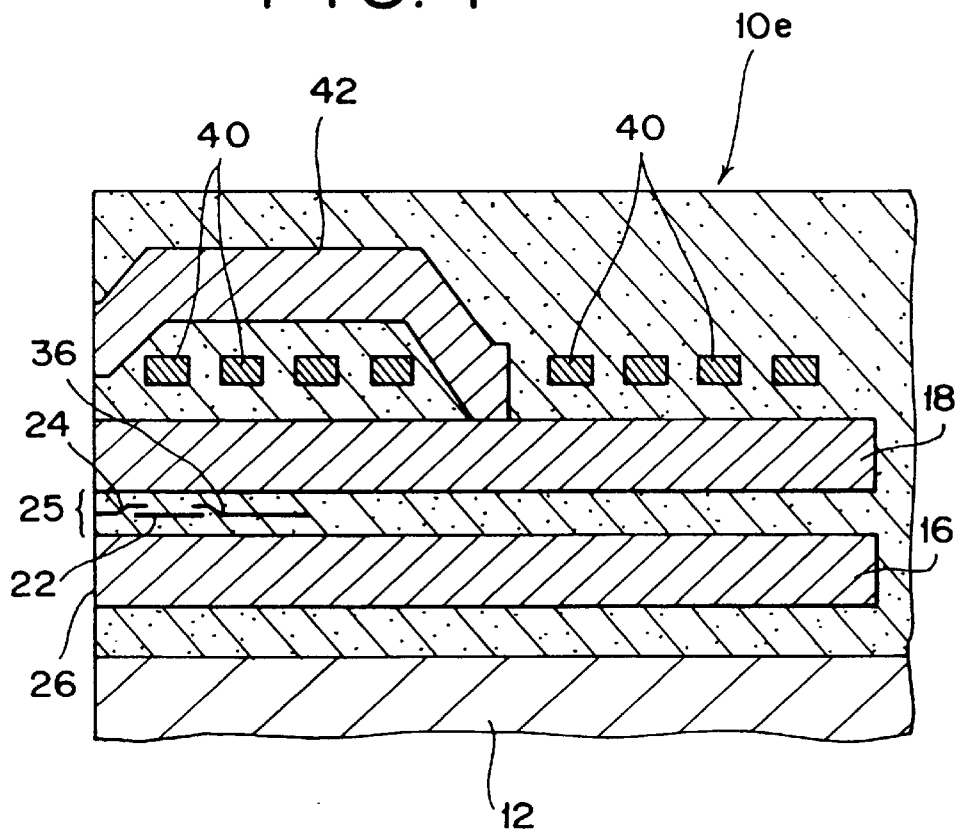
FIG. 7 is a sectional view of a sixth embodiment of the invention.

FIG. 7 is a sectional view of an MR head 10e of a sixth embodiment of the invention, which is of a configuration to be obtained by adding a coil 40 for recording information to the MR head 10a of the second embodiment shown in FIG. 2. Reference numeral 42 denotes a magnetic pole one end of which is exposed in the front end face 26 of the MR head 10e and the other end of which is coupled to the second magnetic shield 18 and the conductor coil 40 is wound round the portion where the magnetic pole 42 is coupled to the second magnetic shield 18 having this portion virtually in the center.

According to the MR head 10e of the present embodiment, by allowing a current modulated with the information to be recorded to flow through the coil 40, a magnetic field corresponding to the value of the current flow is induced and, thereby, the information can be magnetically recorded along the record track 35 of the record medium 34 shown in FIG. 1.

Figure 8:
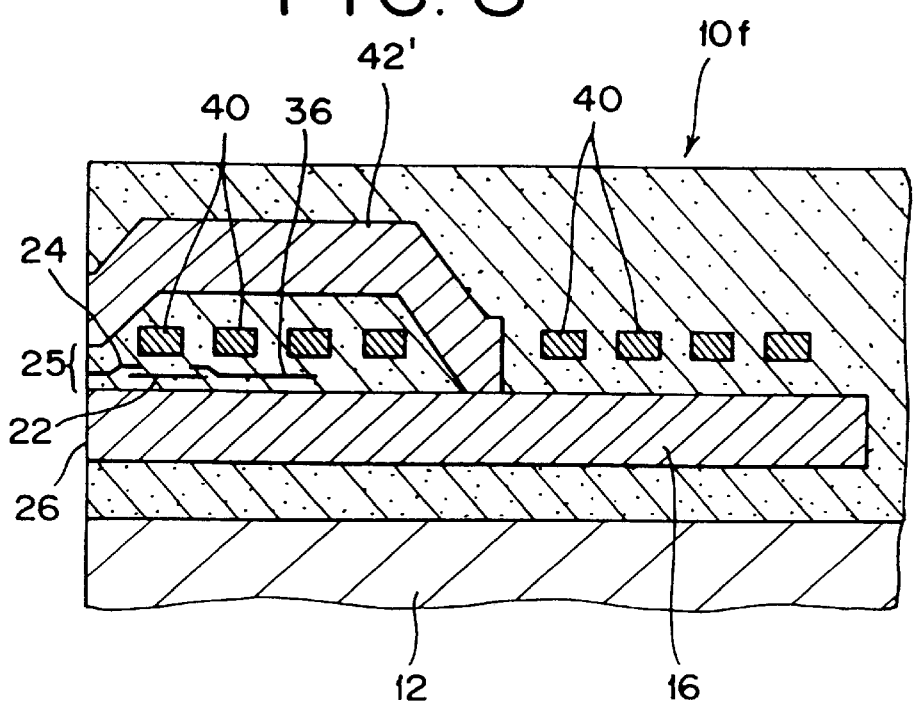
FIG. 8 is a sectional view of a seventh embodiment of the invention.

FIG. 8 shows a sectional view of an MR head 10f of a seventh embodiment of the invention. This embodiment is such that is obtained by eliminating the second magnetic shield 18 in FIG. 7, and a magnetic pole 42' in this case is arranged to serve also as the second magnetic shield. The shield-and-magnetic pole 42' is coupled to the first magnetic shield 16 at a portion kept apart from the front end face 26 of the head and the coil 40 is wound round the portion of coupling having this portion virtually in the center.

According to the present embodiment, since the second magnetic shield 18 is eliminated and the shield-and-magnetic pole 42' is employed, a combination type MR head for recording and reproduction suitable for a high packing density application can be provided.

Figure 9A:
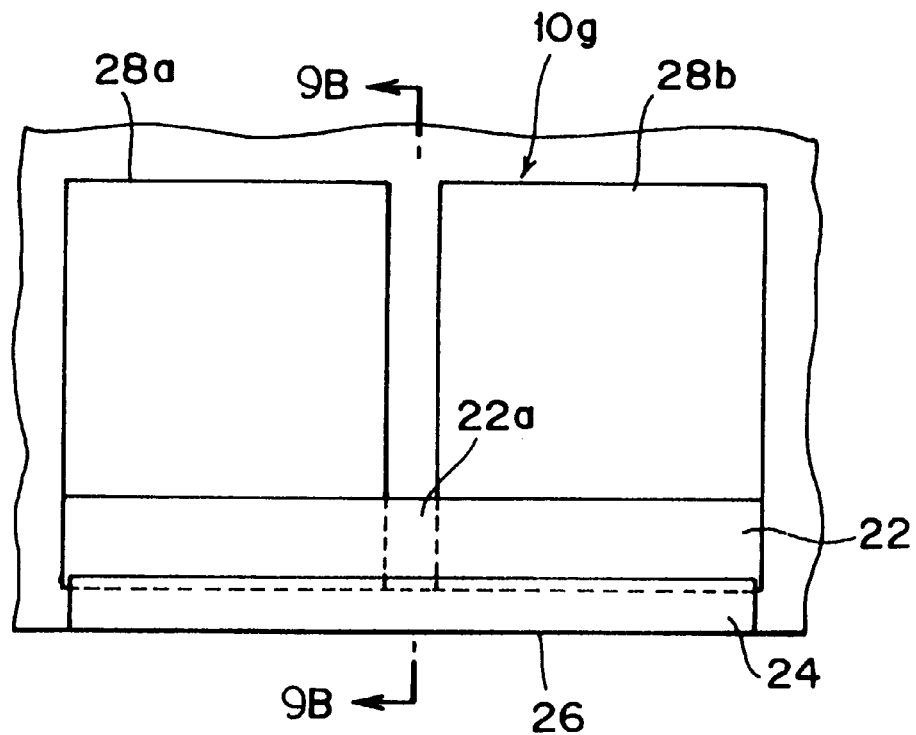
FIG. 9A is a schematic plan view of an eighth embodiment of the invention.
Figure 9B:
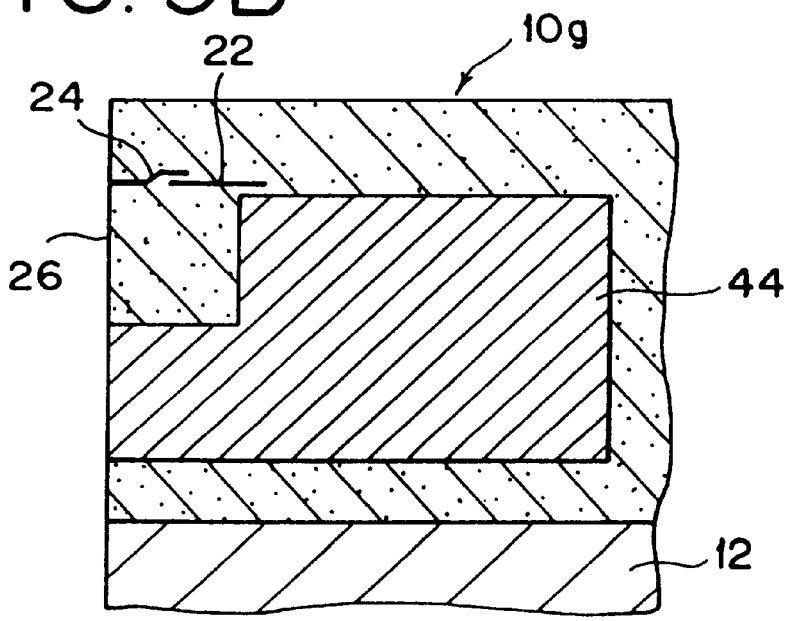
FIG. 9B is a sectional view taken along line B—B of FIG. 9A.

FIG. 9A is a schematic plan view of an MR head 10g of an eighth embodiment of the invention and FIG. 9B is a sectional view taken along line B—B of FIG. 9A. This embodiment is an embodiment suitable for reproducing perpendicular recording, i.e., information recorded by magnetizing a record medium in the perpendicular direction. The MR head 10g includes a front flux guide 24 exposed in the front end face 26 of the head confronting the record medium, a magnetoresistive element 22 set back from the front end face 26 of the head and magnetically coupled to the front flux guide 24, and a return yoke 44 magnetically coupled to the magnetoresistive element 22 for returning the magnetic flux to the record medium.

Since, also in this embodiment, the front flux guide 24 is shaped in a rectangle elongated in the direction of the width of the record track so as to exceed the sense region 22a of the magnetoresistive element 22, this embodiment can give the meritorious effects as obtained from the embodiment shown in FIG. 1.

Figure 10A:
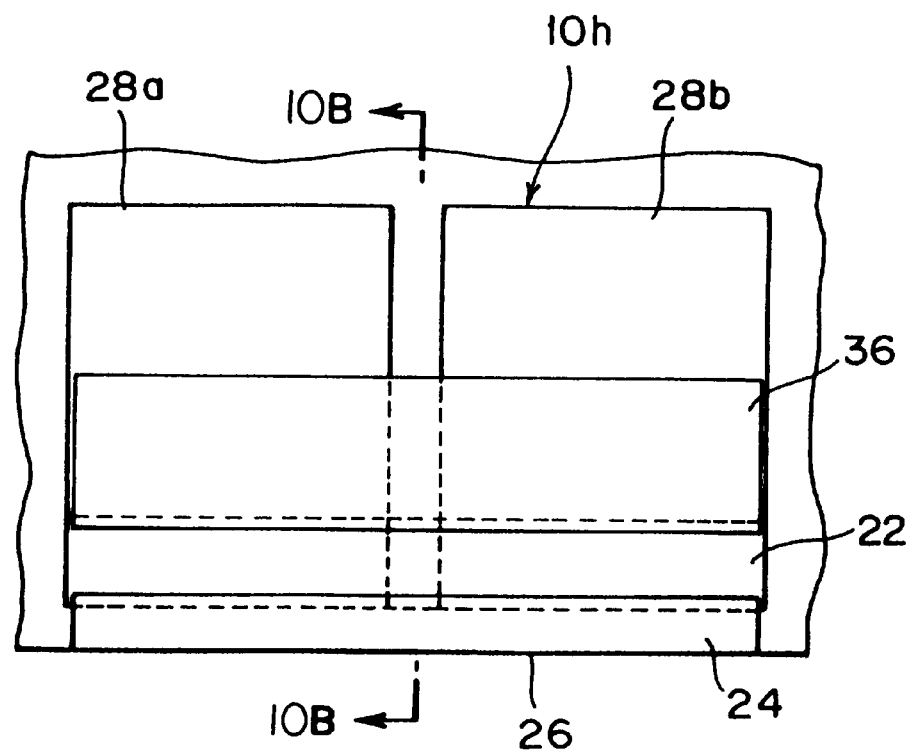
FIG. 10A is a schematic plan view of a ninth embodiment of the invention.
Figure 10B:
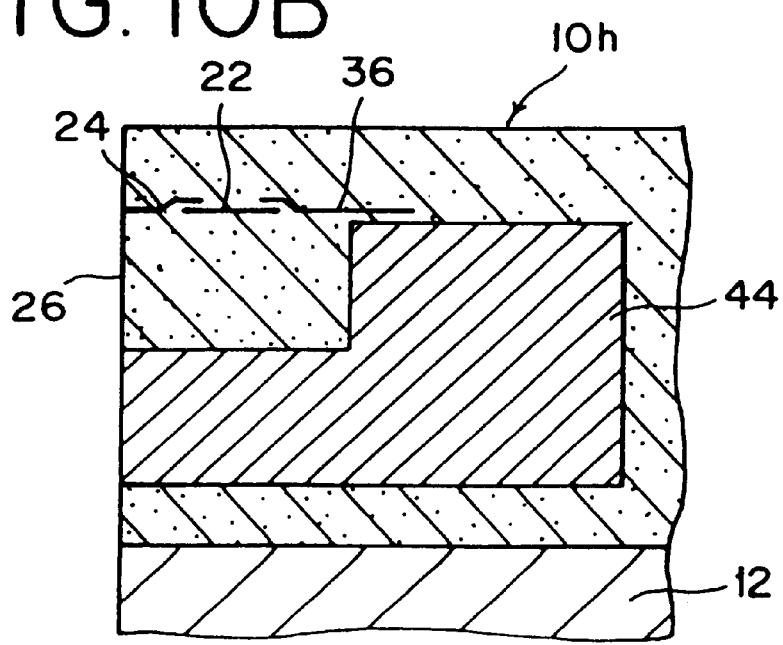
FIG. 10B is a sectional view taken along line B—B of FIG. 10A.

FIGS. 10A and 10B show an MR head 10h of a ninth embodiment of the invention, which is obtained by adding a back flux guide 36 to the MR head 10g of the eighth embodiment shown in FIGS. 9A and 9B. Also this embodiment, like the eighth embodiment shown in FIGS. 9A and 9B, is suitable for reproduction of perpendicular recording. By addition of the back flux guide 36, the demagnetizing field of the magnetoresistive element 22 is suppressed and, hence, the reproducing efficiency can be improved.

Figure 11:
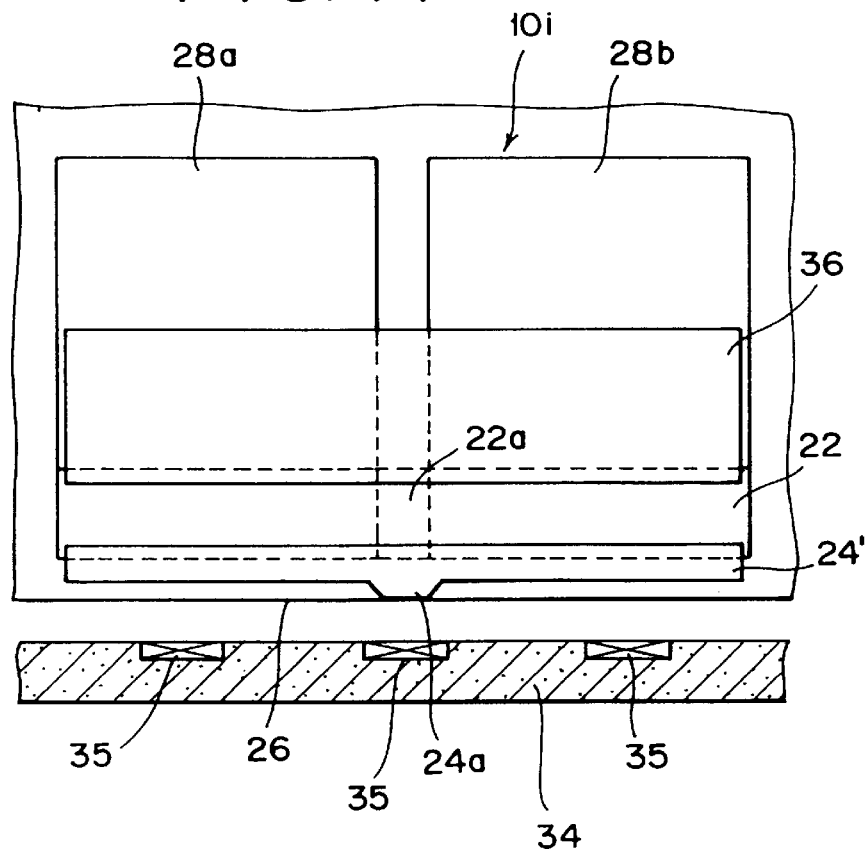
FIG. 11 is a plan view of a tenth embodiment of the invention.

FIG. 11 shows a schematic plan view of an MR head 10i of a tenth embodiment of the invention. The front flux guide 24' of this embodiment has a central projected portion 24a shaped in the form of a trapezoid and only this central projected portion 24a is exposed in the front end face 26 of the head 10i. The exposed width of the projected portion 24a is formed to be smaller than the width of the record track 35.

As with all the embodiments described above, it is preferred that the width of the sense region 22a of the magnetoresistive element 22 defined by the terminals 28a and 28b is formed to be smaller than the width of the record track 35. Since, in the present embodiment, the front flux guide 24' is exposed in the front end face 26 of the head only at its central projected portion 24a, side crosstalk is effectively suppressed.

Figure 12:
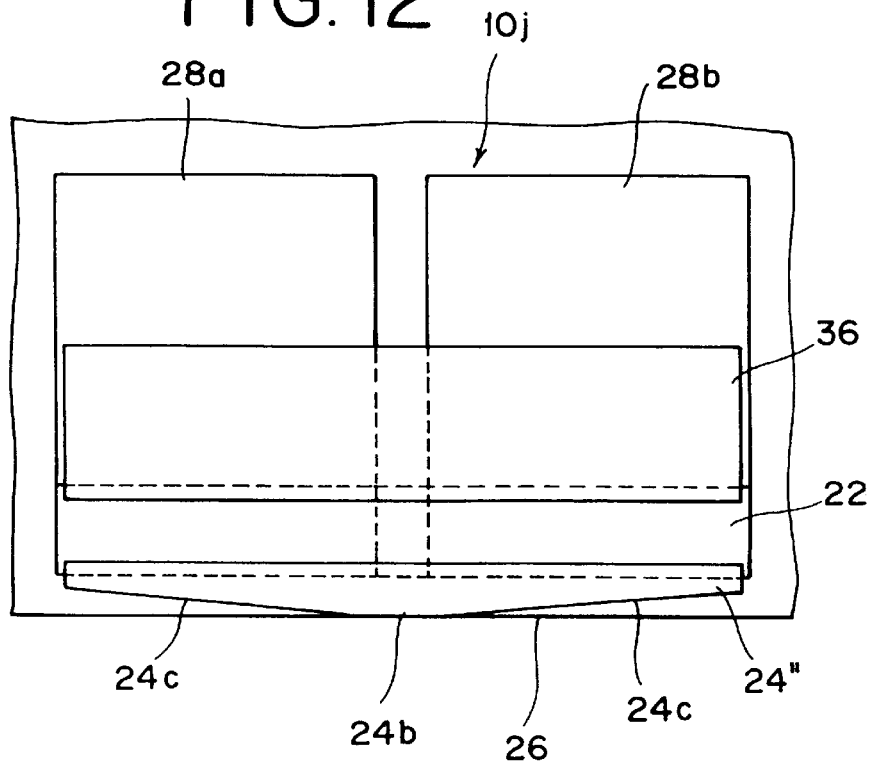
FIG. 12 is a plan view of an eleventh embodiment of the invention.

FIG. 12 shows a schematic plan view of an MR head 10j of an eleventh embodiment of the invention. This embodiment is a modification of the tenth embodiment shown in FIG. 11. The front flux guide 24" of this embodiment has a central exposed portion 24b exposed in the front end face 26 of the head of a size smaller than the width of the record track, and its front edge 24c is arranged to be progressively apart from the front end face 26 of the head as it goes from the central exposed portion 24b toward both ends.

In the tenth embodiment shown in FIG. 11, the magnetic domain controllability is deteriorated to a certain degree because the central projected portion 24a in a trapezoidal form is provided therein, but the front flux guide 24" in the present embodiment has no angled portion and, therefore, the magnetic domain controllability is not deteriorated.

Figure 13:
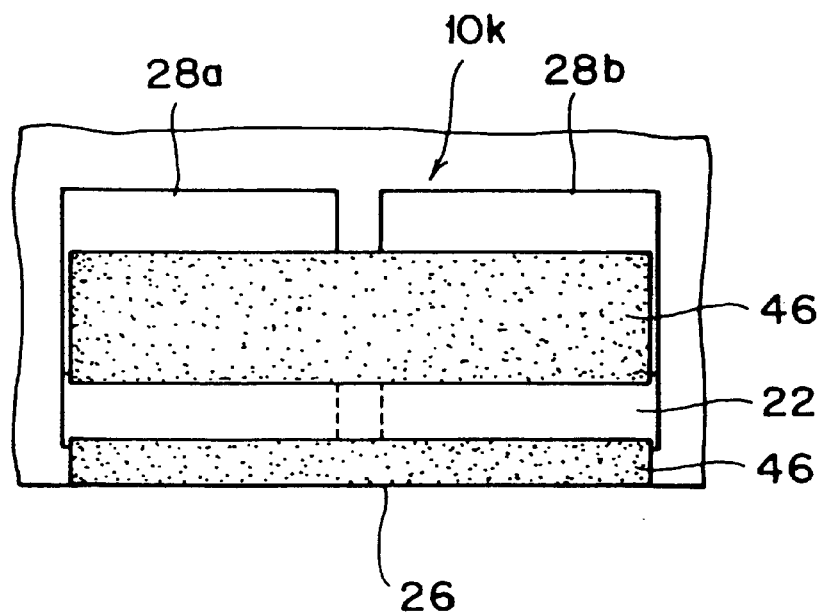
FIG. 13 is a plan view of a twelfth embodiment of the invention.

FIG. 13 shows a schematic plan view of an MR head 10k of a twelfth embodiment of the invention, in which the front and back flux guides have antiferromagnetic films 46 of FeMn, NiO, MnO, $Cr_2O_3$, FeS, or the like deposited over the whole surfaces. The magnetic field in the direction of the width of the record track is applied to the front and back flux guides by the exchange interaction between the antiferromagnetic films 46 and the front and back flux guides and, thereby, stabilization of magnetic domains in the flux guides is enhanced. More specifically, the easy axis of magnetization of the front and back flux guides is stably aligned with the direction of the width of the track.

Figure 14:
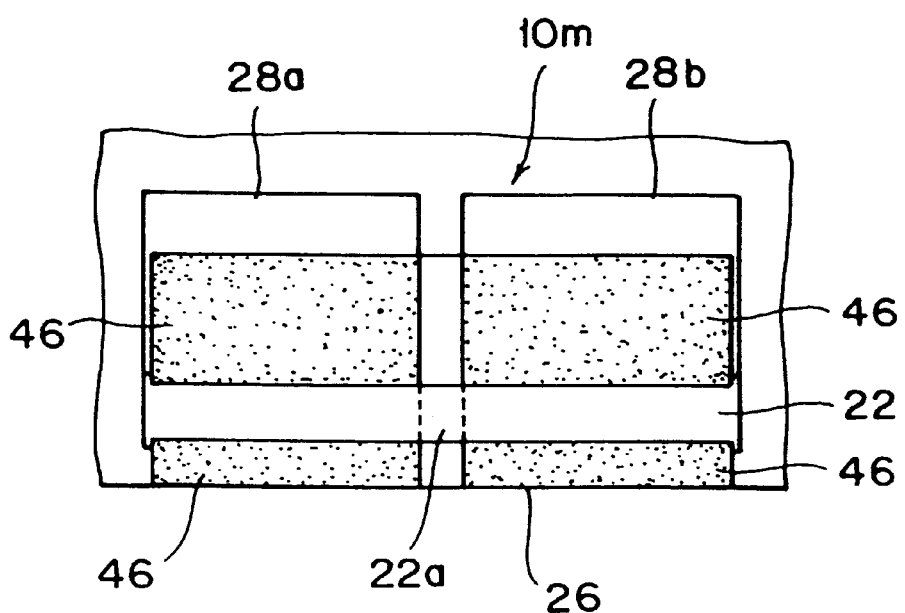
FIG. 14 is a plan view of a thirteenth embodiment of the invention.

FIG. 14 shows a schematic plan view of an MR head 10m of a thirteenth embodiment of the invention, in which antiferromagnetic films 46 are deposited over the front and back flux guides except their portions whose width is virtually equal to the sense region 22a of the magnetoresistive element 22. According to this embodiment, stabilization of the magnetic domains in the front and back flux guides can be achieved without causing the permeability of the magnetoresistive element 22 to be lowered at its sense region 22a.

Figure 15:
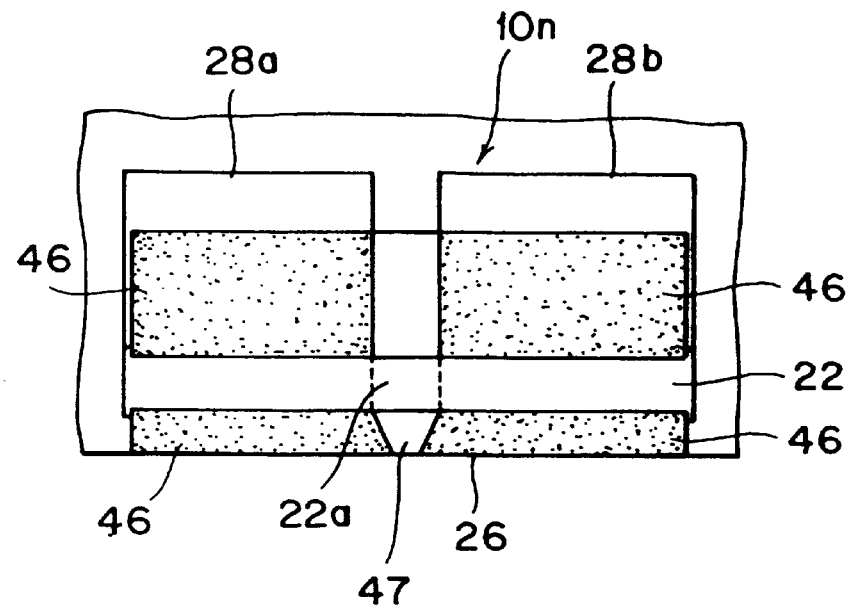
FIG. 15 is a plan view of a fourteenth embodiment of the invention.

FIG. 15 shows a schematic plan view of an MR head 10n of a fourteenth embodiment of the invention, in which the width of the portion of the flux guide over which the antiferromagnetic film 46 is not deposited is changed between the side of the front end face 26 confronting the medium and the side of the magnetoresistive element 22.

In this embodiment, the width of the sense region 22a of the magnetoresistive element 22 is formed to be larger than the width of the record track. The width of the central portion in the trapezoidal form 47 of the front flux guide over which no antiferromagnetic film 46 is deposited is formed to be smaller than the width of the record track in the front end face 26 and to be virtually equal to the width of the sense region 22a of the magnetoresistive element 22 on the side where it is coupled to the magnetoresistive element 22.

Figure 16:
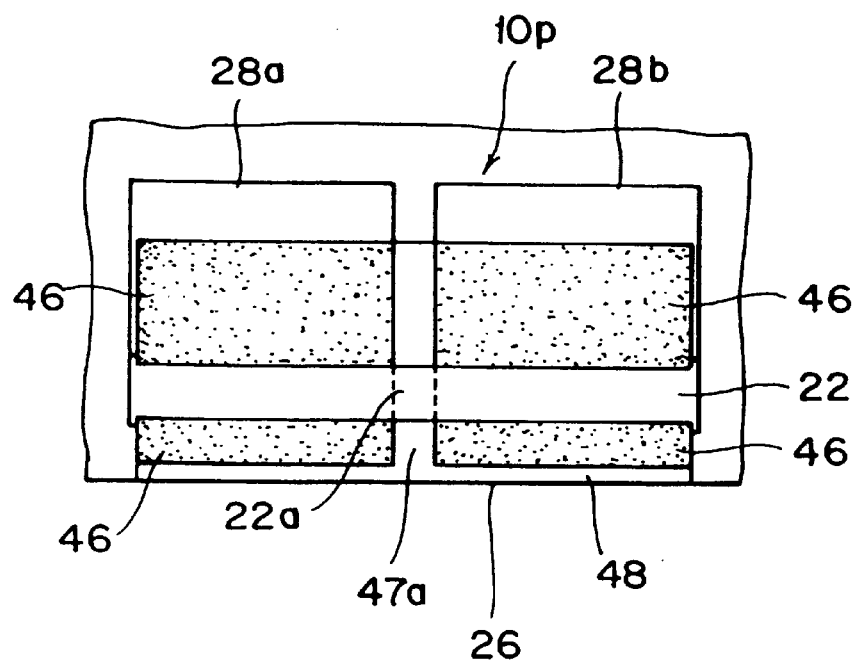
FIG. 16 is a plan view of a fifteenth embodiment of the invention.

FIG. 16 shows a schematic plan view of an MR head 10p of a fifteenth embodiment of the invention, in which an antiferromagnetic film 46 is deposited over the front flux guide except its central portion 47a whose width is correspondent to the width of the sense region 22a of the magnetoresistive element 22 and its front edge portion 48 with a predetermined width.

Figure 17:
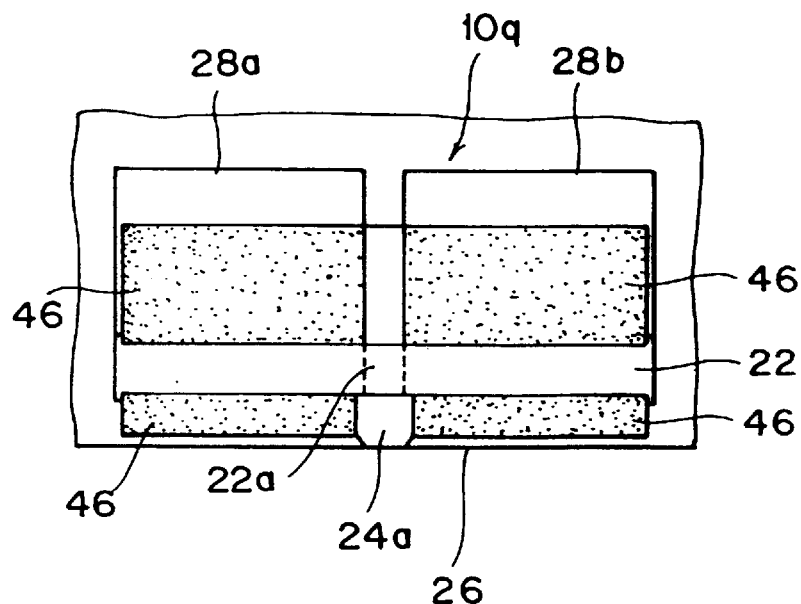
FIG. 17 is a plan view of a sixteenth embodiment of the invention.

FIG. 17 shows a schematic plan view of an MR head 10q of a sixteenth embodiment of the invention. In this embodiment, the same as in the tenth embodiment shown in FIG. 11, only a central projected portion 24a of the front flux guide is exposed in the front end face 26 of the head confronting the medium. Antiferromagnetic films 46 are deposited on the surface of the front flux guide except the central projected portion 24a and over the back flux guide except its portion having a width correspondent to the width of the sense region 22a of the magnetoresistive element 22.

Figure 18:
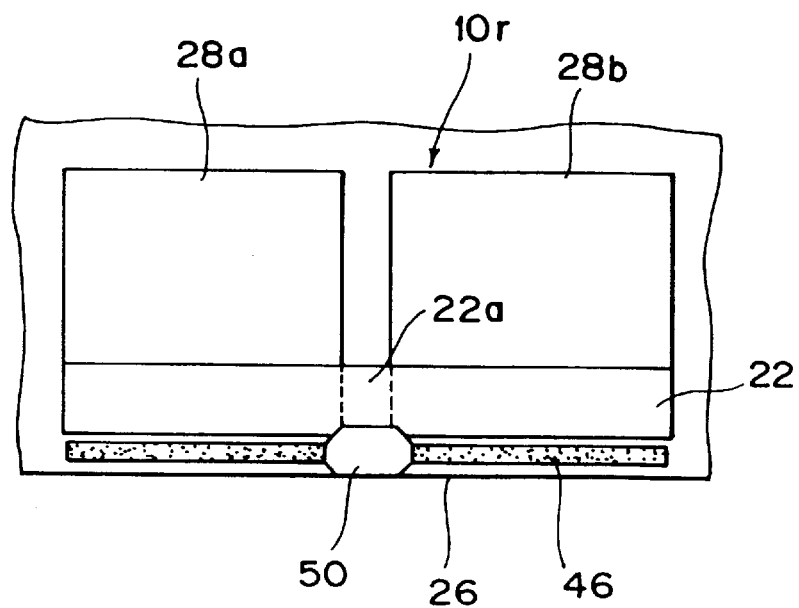
FIG. 18 is a plan view of a seventeenth embodiment of the invention.

FIG. 18 shows a schematic plan view of an MR head 10r of a seventeenth embodiment of the invention. In this embodiment, the front flux guide is exposed in the front end face 26 of the head confronting the medium only at its central portion 50, while the other portion of the front flux guide is set back from the front end face 26. Further, the front flux guide is overlapping with the magnetoresistive element 22 only at its central portion 50 to be coupled to the same, while, in the other portion, the front flux guide is separated from the magnetoresistive element 22.

Further, an antiferromagnetic film 46 is deposited over the front flux guide except its central portion 50. According to this embodiment, since the front flux guide is magnetically coupled to the magnetoresistive element 22 only at the central portion 50 corresponding to the sense region 22a of the magnetoresistive element 22, side crosstalk can be effectively suppressed.

Figure 19:
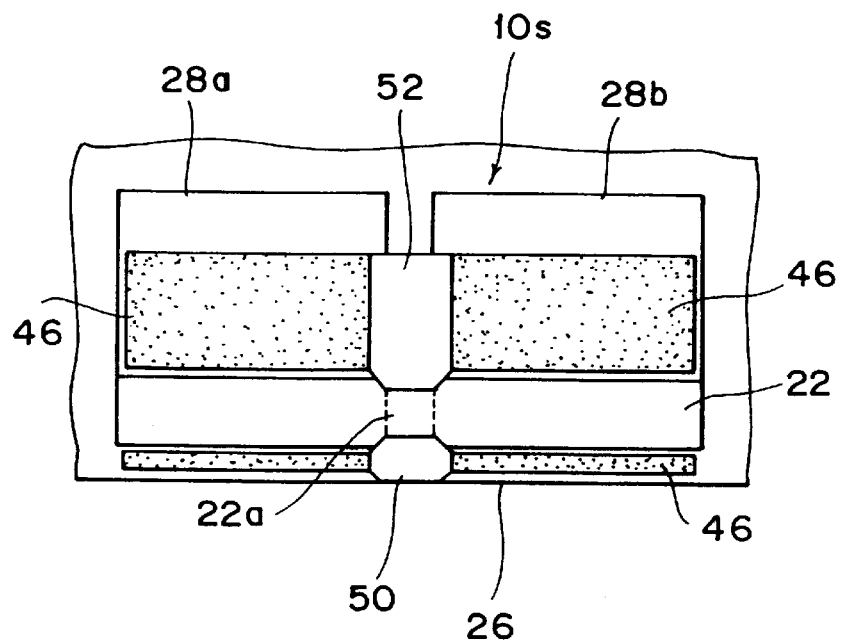
FIG. 19 is a plan view of an eighteenth embodiment of the invention.

FIG. 19 shows a schematic plan view of an MR head 10s of an eighteenth embodiment of the invention. This embodiment is such that is obtained by adding a back flux guide to the seventeenth embodiment of FIG. 18. The back flux guide is also overlapping with the magnetoresistive element 22 only at the central portion 52 and separated from the same in the other portion, and the back flux guide has an antiferromagnetic film 46 deposited thereon except the central portion 52.

Figure 20:
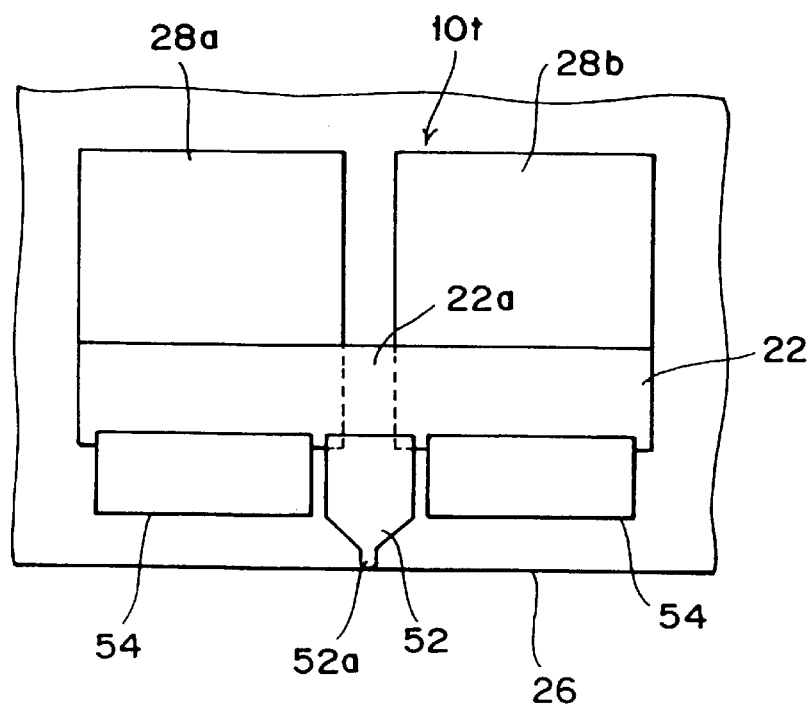
FIG. 20 is a plan view of a nineteenth embodiment of the invention.

FIG. 20 shows a schematic plan view of an MR head 10t of a nineteenth embodiment of the invention. In this embodiment, a front flux guide 52 virtually in the form of a home plate is used in place of the front flux guide 24 in the form of a rectangle in the above described embodiments, and it is magnetically coupled to the magnetoresistive element 22 at the portion around the sense region 22a of the magnetoresistive element 22.

The front flux guide 52 has a signal reading portion 52a exposed in the front end face 26 confronting the medium and the width of the signal reading portion 52a is formed to be smaller than the width of the record track. On both sides of the front flux guide 52, there are disposed a pair of magnetic films 54 along the magnetoresistive element 22 and these magnetic films 54 are magnetically coupled to the magnetoresistive element 22.

While the front flux guide 52 virtually in the form of a home plate is employed in the present embodiment, by virtue of the pair of magnetic films 54 disposed on both sides of the front flux guide 52, the easy axis of magnetization of the front flux guide 52 can be easily aligned with the direction parallel to the width of the record track. The magnetic film 54 can be formed of CoCrTa, CoCrPt, iron garnet, ferrimagnetic film, or the like.

Figure 21:
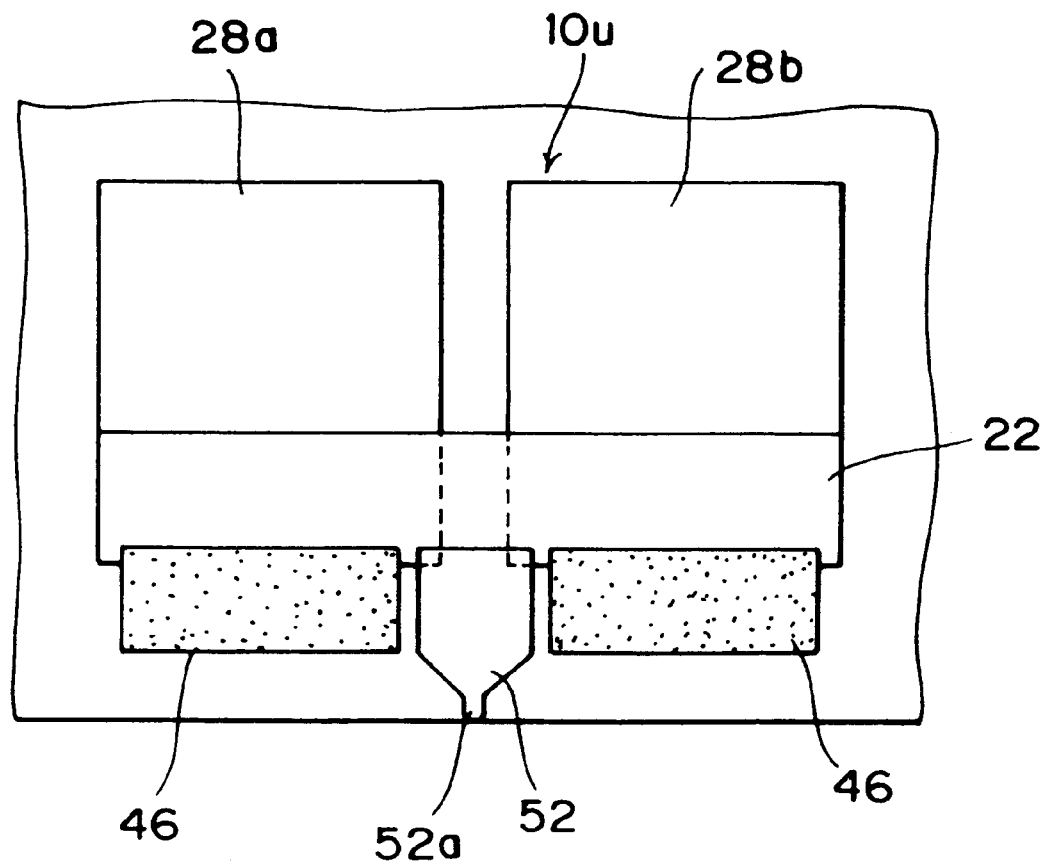
FIG. 21 is a plan view of a twentieth embodiment of the invention.

FIG. 21 shows a schematic plan view of an MR head 10u of a twentieth embodiment of the invention, which is obtained by depositing antiferromagnetic films 46 over the soft magnetic films 54 shown in FIG. 20. By depositing the antiferromagnetic films 46 over the magnetic films 54, the easy axis of magnetization of the front flux guide 52 can be aligned with the direction of the width of the record track in more stabilized manner.

Figure 22A:
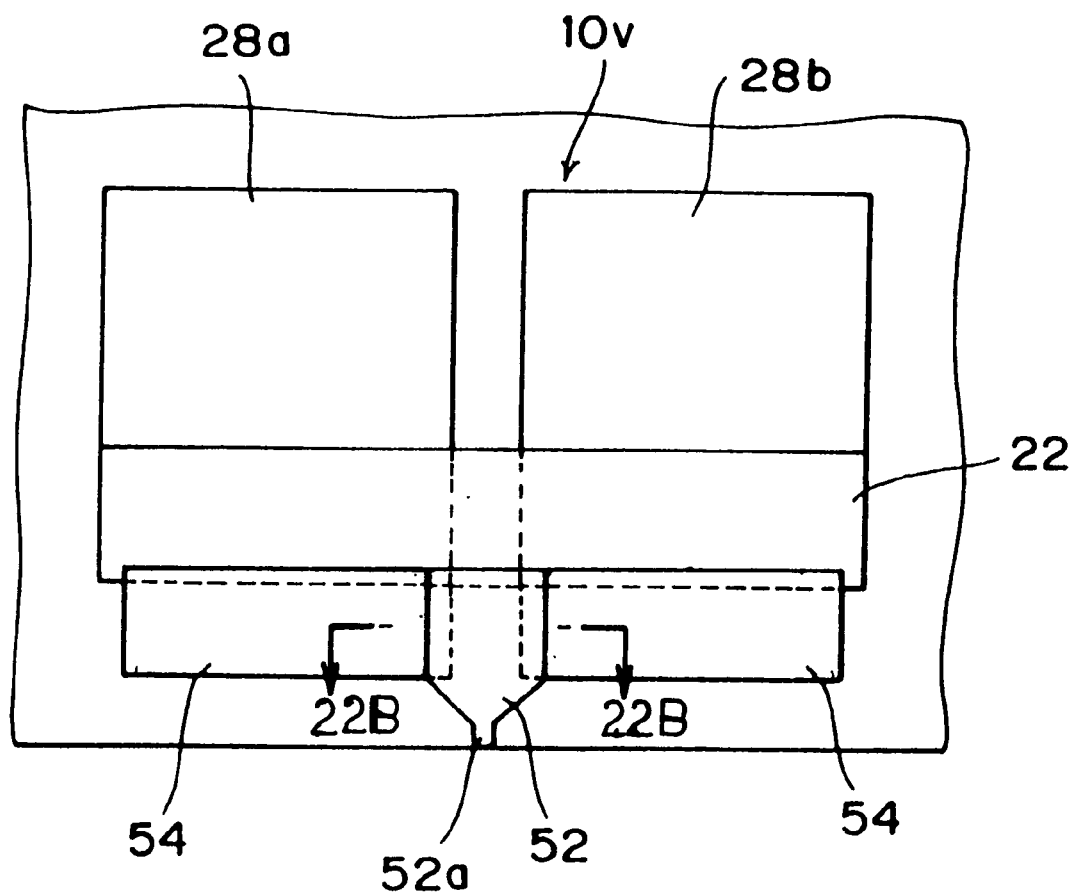
FIG. 22A is a schematic plan view of a twenty-first embodiment of the invention.
Figure 22B:
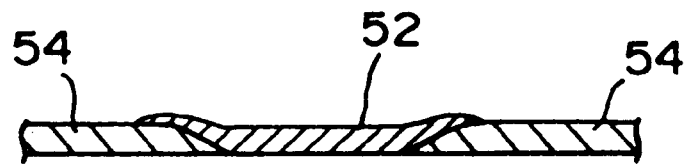
FIG. 22B is a sectional view taken along line A—A of FIG. 22B.

FIG. 22A shows a schematic plan view of a twenty-first embodiment 10v of the invention, which is a modification of the nineteenth embodiment shown in FIG. 20. In this embodiment, as best shown in FIG. 22B the front flux guide 52 is formed so as to cover up portions of a pair of magnetic films 54 disposed on both sides of the front flux guide 52 along the length of the magnetoresistive element 22. As a matter of course, it may also be arranged inversely such that the magnetic films 54 cover up end portions of the flux guide 52.

Since the front flux guide 52 is formed so as to partly overlap with the pair of magnetic films 54, the easy axis of magnetization of the front flux guide 52 can be controlled more efficiently.

While in the above described embodiments an antiferromagnetic film has been deposited on the front flux guide 24 and the back flux guide 36, a permanent magnet film or ferrimagnetic film may be deposited in place of the antiferromagnetic film.

According to the present invention, as described so far, it is made possible to stably align the easy axis of magnetization, which is essential for realization of a single magnetic domain structure in the flux guide, with the direction parallel to the width of the record track of the medium. Therefore, the variations in the reproduced output and reproduced waveform by the magnetoresistive element due to variations in magnetic domains in the flux guide can be effectively prevented. Accordingly, it is made possible to provide a magnetoresistive head which performs an extremely stabilized function of responding to the signal magnetic field from the record medium during the reproduction.

In each preferred embodiment mentioned above, the directions of magnetization of the magnetoresistive element and the flux guide are decided to the same direction by the effect of the antiferromagnetic film laminated thereon. Accordingly, there is a possibility of reduction in sensitivity of the magnetoresistive element and reduction in permeability of the flux guide due to magnetic fields generating each other. There will now be described other preferred embodiments of the present invention having solved this problem.

Figure 23A:
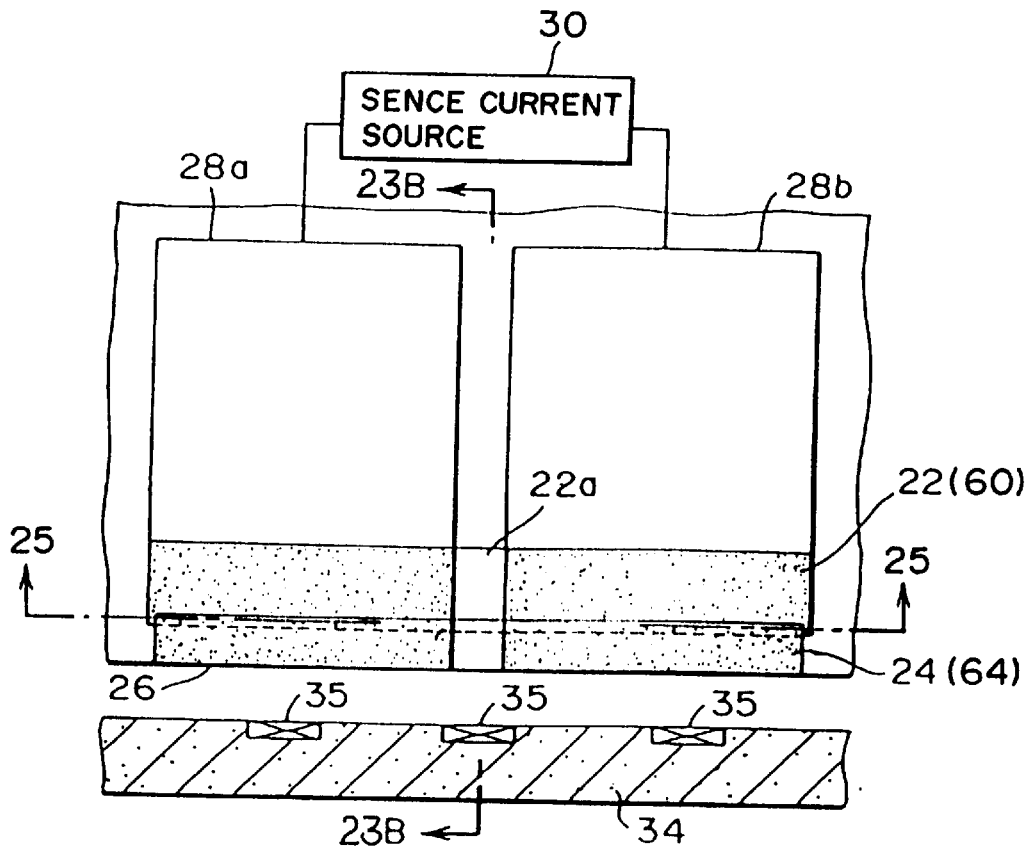
FIG. 23A is a schematic plan view of a twenty-second preferred embodiment of the present invention.
Figure 23B:
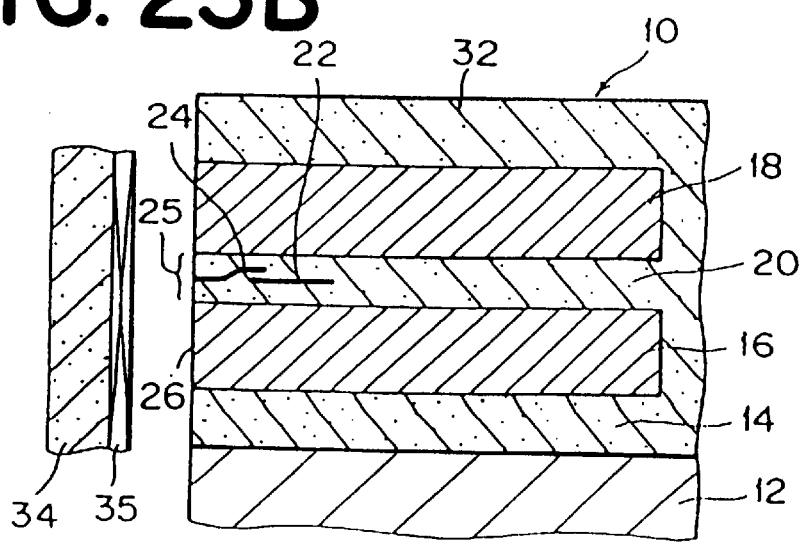
FIG. 23B is a cross section taken along the line B—B in FIG. 23A.

Referring to FIGS. 23A and 23B, there are shown a schematic plan view and a sectional view of a twenty-second preferred embodiment of the present invention, respectively, which is similar to the first preferred embodiment shown in FIGS. 1A and 1B. In the following description of this preferred embodiment, substantially the same parts as those in the first preferred embodiment shown in FIGS. 1A and 1B will be denoted by the same reference numerals, and the explanation thereof will be omitted to avoid repetition.

Figure 25:
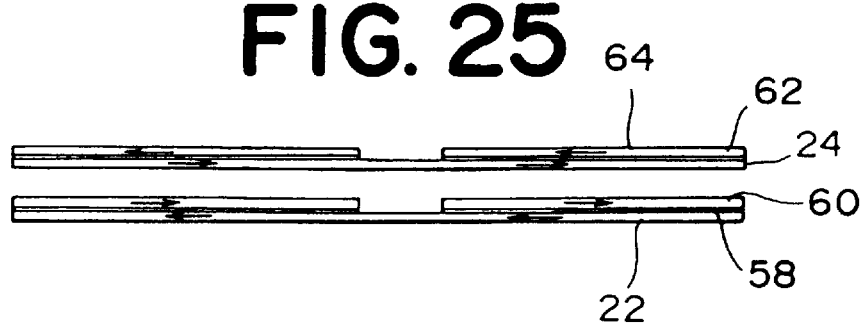
FIG. 25 is a cross section taken along the line 25—25 in FIG. 24A.

This preferred embodiment is different from the first preferred embodiment in the following point. That is, as shown in FIG. 25, a hard magnetic film 60 is laminated through a Cr base layer 58 on the magnetoresistive element 22 except its central portion. The hard magnetic film 60 is formed of CoCrTa or CoCrPt, for example. Similarly, a hard magnetic film 64 is laminated through a Cr base layer 62 on the front flux guide 24 except its central portion. The hard magnetic film 64 is formed of CoCrTa or CoCrPt, for example, like the hard magnetic film 60.

The hard magnetic film 60 has a first direction of magnetization parallel to the direction of the width of the record track, and the hard magnetic film 64 has a second direction of magnetization opposite to the first direction of magnetization. As the hard magnetic film 60 is laminated on the magnetoresistive element 22, the magnetoresistive element 22 has the second direction of magnetization opposite to the first direction of magnetization owing to magnetostatic bond. Similarly, as the hard magnetic film 64 is laminated on the front flux guide 24, the front flux guide 24 has the first direction of magnetization opposite to the second direction of magnetization.

As a result, the magnetoresistive element 22 and the front flux guide 24 are so defined as to have the directions of magnetization opposite to each other as shown by arrows in FIG. 25. Accordingly, a magnetic stability of the magnetoresistive element 22 and the front flux guide 24 due to magnetic fields generating each other are eliminated to thereby improve the stability of the reproduced output from the MR head. The coercive forces of the hard magnetic films 60 and 64 can be adjusted by controlling the thicknesses of the Cr base films 58 and 62. The width of the central portion of the magnetoresistive element 22 on which the hard magnetic film 60 is not formed may be different from the width of the central portion of the front flux guide 24 on which the hard magnetic film 64 is not formed.

The signal magnetic flux from the record track 35 of the record medium 34 is applied to the head 10, guided along the front flux guide 24 to flow into the magnetoresistive element 22, and thereby the magnetoresistive element 22 is magnetized. The magnetic flux passing through the magnetoresistive element 22 is absorbed by the first and second magnetic shields 16 and 18. The magnetoresistive element 22 changes its resistance value according to changes in the magnitude of the signal magnetic flux. Since a constant sense current from the sense current source 30 is supplied to the magnetoresistive element 22, the voltage between the terminals 28a and 28b changes with changes in the resistance value and, thereby, information recorded on the record medium 34 can be reproduced as a voltage signal.

In this embodiment, since the front flux guide 24 is shaped in the form of a rectangle elongated sideways so as to exceed the width of the sense region 22a and the record track 35, its easy axis of magnetization can be oriented to the direction parallel to the direction of the width of the record track 35 by virtue of the shape anisotropy of the front flux guide 24 and, thereby, a single magnetic domain structure can be realized easily. Further, since the magnetoresistive element 22 and the front flux guide 24 have the directions of magnetization opposite to each other, a reduction in sensitivity of the magnetoresistive element 22 and a reduction in permeability of the front flux guide 24 due to magnetic fields generating each other are eliminated to thereby improve the reproduced output.

Figure 2B:
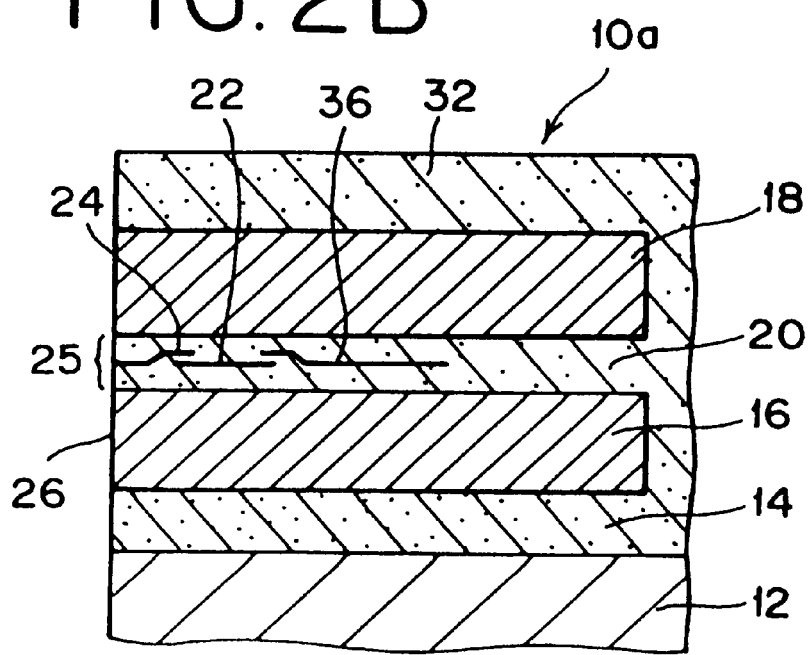
FIG. 2B is a sectional view taken along line B—B of FIG. 2A.
Figure 24A:
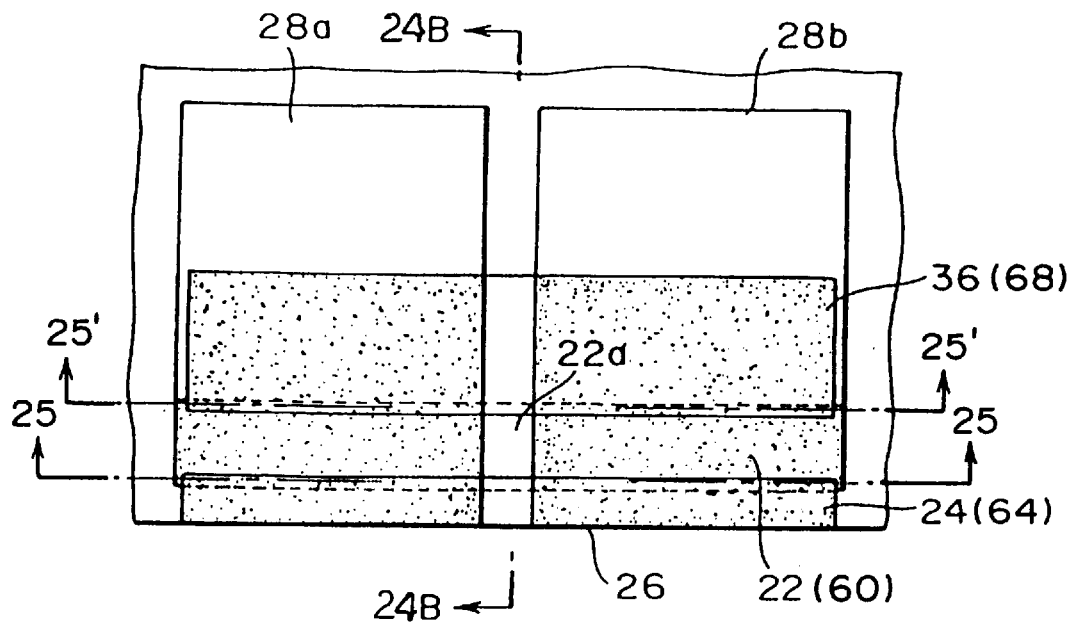
FIG. 24A is a schematic plan view of a twenty-third preferred embodiment of the present invention.
Figure 24B:
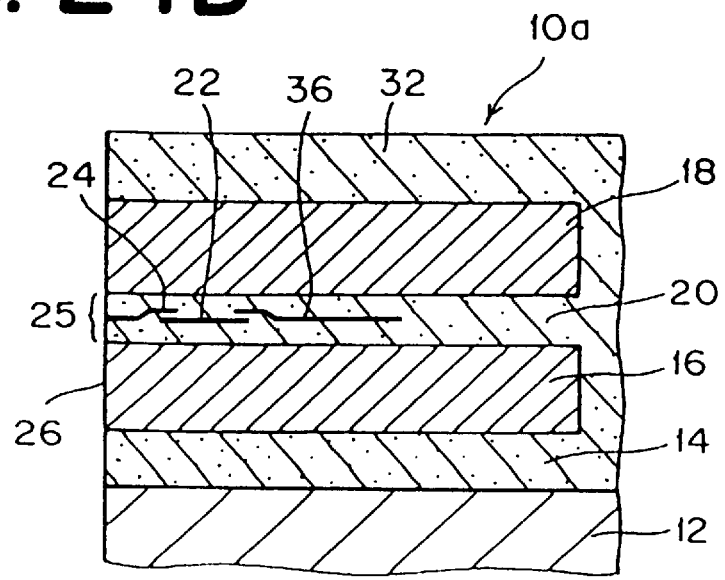
FIG. 24B is a cross section taken along the line B—B in FIG. 24A.

Referring to FIGS. 24A and 24B, there are shown a schematic plan view and a sectional view of a twenty-third preferred embodiment of the present invention, respectively, which is similar to the second preferred embodiment shown in FIGS. 2A and 2B. In the following description of this preferred embodiment, substantially the same parts as those in the second preferred embodiment shown in FIGS. 2A and 2B will be denoted by the same reference numerals, and the explanation thereof will be omitted to avoid repetition.

In this preferred embodiment, a back flux guide 36 is added to the twenty-second preferred embodiment shown in FIGS. 23A and 23B. Like the front flux guide 24, the back flux guide 36 is formed of nickel-iron (Ni-Fe), for example. The back flux guide 36 is magnetically coupled at its one end to the magnetoresistive element 22.

Although not shown, a cross section taken along the line 25'—25' in FIG. 24A is similar to the cross section shown in FIG. 25, taken along the line 25—25 in FIG. 23A. A hard magnetic film 68 is laminated through a Cr base layer on the back flux guide 36 except its central portion. The hard magnetic film 68 has the same direction of magnetization as that of the hard magnetic film 64. Therefore, the back flux guide 36 has the same direction of magnetization as that of the front flux guide 24. This preferred embodiment has an effect that a demagnetizing field of the magnetoresistive element 22 can be suppressed by the provision of the back flux guide 36, in addition to the effect of the twenty-second preferred embodiment mentioned above.

Figure 26A:
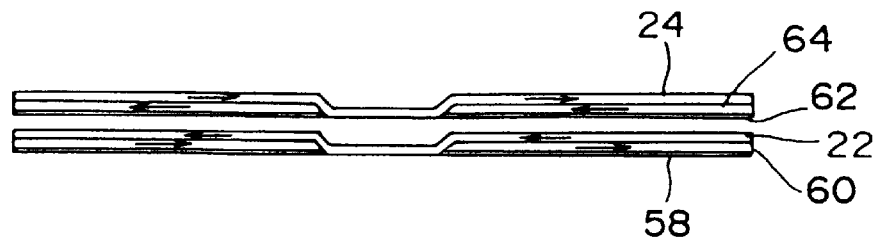
FIGS. 26A to 26C are sectional views of other preferred embodiments of the present invention.
Figure 26B:
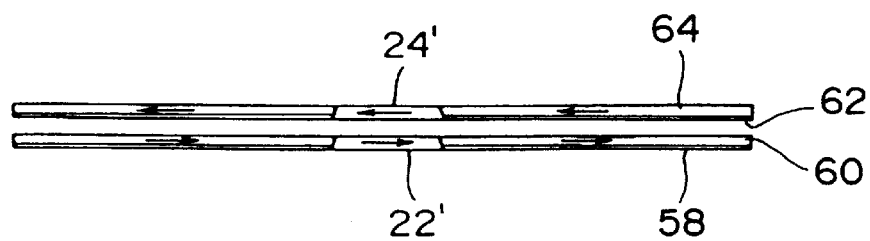
Figure 26C:
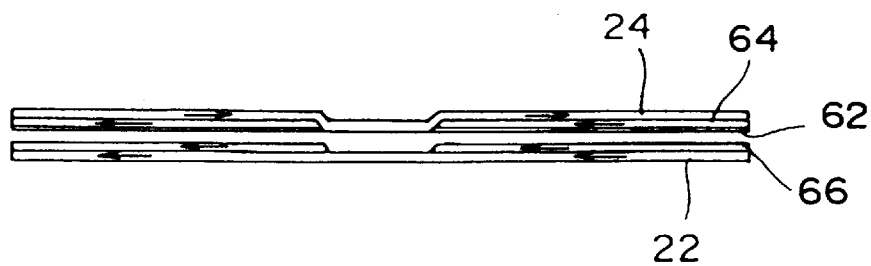

Referring to FIGS. 26A to 26C, there are shown sectional views of other preferred embodiments of the present invention. The structure shown in FIG. 26A is similar to that shown in FIG. 25, with the exception that the hard magnetic films 60 and 64 are formed on the lower sides of the magnetoresistive element 22 and the front flux guide 24, respectively. The direction of magnetization of each film is shown by an arrow. This preferred embodiment operates similarly to the preferred embodiment shown in FIG. 25.

In the preferred embodiment shown in FIG. 26B, a magnetoresistive element 22' has a width reduced in the direction of the width of the record track 35, and a sense region is formed over the width of the magnetoresistive element 22'. A front flux guide 24' is formed to have substantially the same width as the width of the magnetoresistive element 22'. The hard magnetic film 60 is formed on the opposite sides of the magnetoresistive element 22', and the hard magnetic film 64 is formed on the opposite sides of the front flux guide 24'. The hard magnetic films 60 and 64 are so defined as to have the directions of magnetization opposite to each other. Accordingly, the direction of magnetization of the magnetoresistive element 22' is made the same as that of the hard magnetic film 60 by magnetostatic bond, and the direction of magnetization of the front flux guide 24' is made the same as that of the hard magnetic film 64, thus attaining an effect similar to that in each preferred embodiment mentioned above.

In the preferred embodiment shown in FIG. 26C, an antiferromagnetic film 66 is laminated on the magnetoresistive element 22 except its central portion, and the front flux guide 24 is laminated on the hard magnetic film 64. The antiferromagnetic film 66 is formed of FeMn or NiO, for example. In this preferred embodiment, the direction of magnetization of the antiferromagnetic film 66 is transferred to the magnetoresistive element 22 by exchange coupling, so that the hard magnetic film 64 and the antiferromagnetic film 66 are magnetized in the same direction. Accordingly, the magnetoresistive element 22 and the front flux guide 24 have the directions of magnetization opposite to each other. As a modification of the preferred embodiment shown in FIG. 26C, the direction of magnetization of the magnetoresistive element 22 may be defined by the hard magnetic film, and the direction of magnetization of the front flux guide may be defined by the antiferromagnetic film.

Figure 27A:
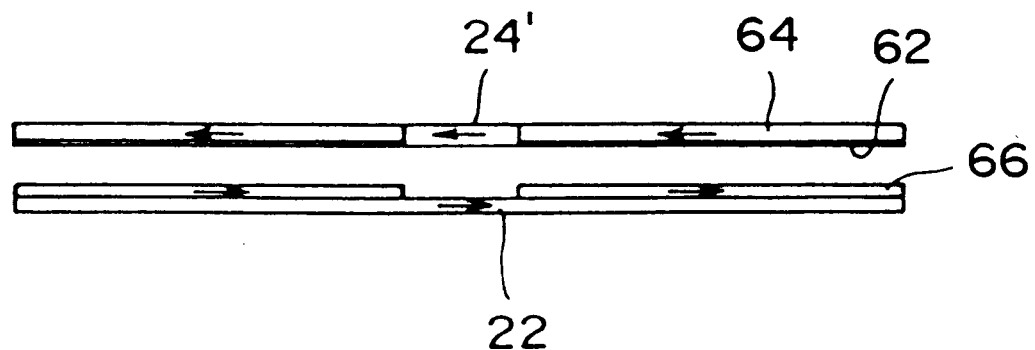
FIGS. 27A and 27B are sectional views of still other preferred embodiments of the present invention.
Figure 27B:
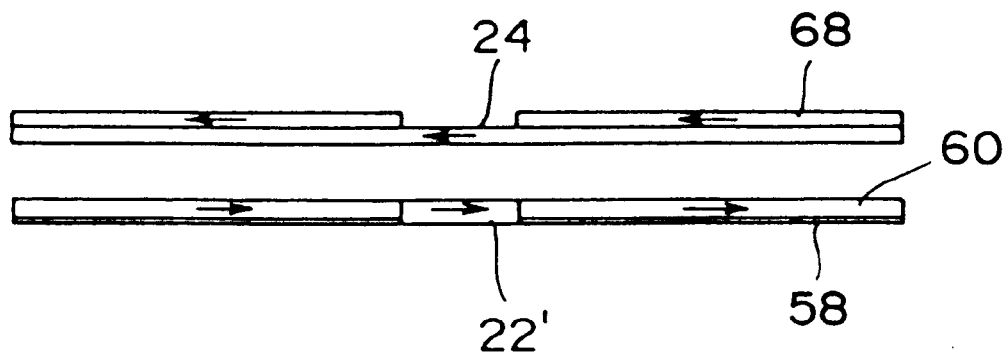

Referring to FIGS. 27A and 27B, there are shown sectional views of still other preferred embodiments of the present invention. In the preferred embodiment shown in FIG. 27A, the antiferromagnetic film 66 is laminated on the magnetoresistive element 22 except its central portion, and the hard magnetic film 64 is formed on the opposite sides of the front flux guide 24'. In this preferred embodiment, the hard magnetic film 64 and the antiferromagnetic film 66 are magnetized in the opposite directions. Accordingly, the magnetoresistive element 22 and the front flux guide 24' have the directions of magnetization opposite to each other.

In the preferred embodiment shown in FIG. 27B, the hard magnetic film 60 is formed on the opposite sides of the magnetoresistive element 22', and an antiferromagnetic film 68 is laminated on the front flux guide 24 except its central portion. Also in this preferred embodiment, the hard magnetic film 60 and the antiferromagnetic film 68 are magnetized in the opposite directions. Accordingly, the magnetoresistive element 22' and the front flux guide 24 have the directions of magnetization opposite to each other.

Figure 28A:
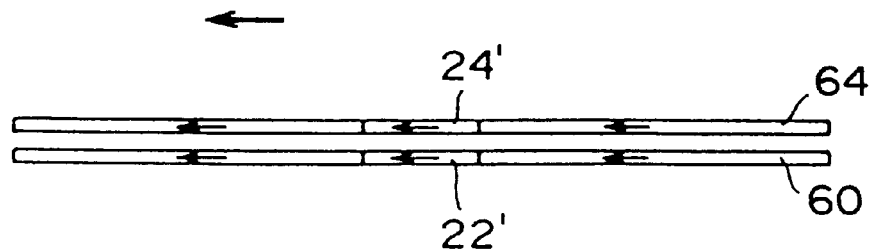
FIGS. 28A to 28D are sectional views illustrating a method of defining a direction of magnetization.

A method of defining a direction of magnetization will now be described with reference to FIGS. 28A to 28D. The coercive forces Hc of the hard magnetic films 60 and 64 formed of CoCrTa or the like can be changed to about 100 to 2000 oersteds (Oe) by changing the thicknesses of the Cr base layers, for example. As shown in FIG. 28A, the CoCrTa film 60 having a coercive force Hc of 500 Oe is arranged on the opposite sides of the magnetoresistive element 22', and the CoCrTa film 64 having a coercive force of 1000 Oe is arranged on the opposite sides of the front flux guide 24'.

Figure 28B:
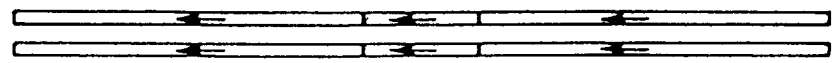
Figure 28C:
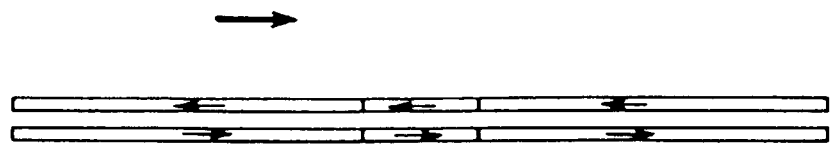
Figure 28D:
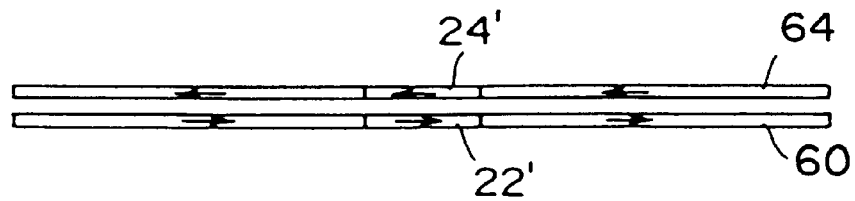
Figure 29:
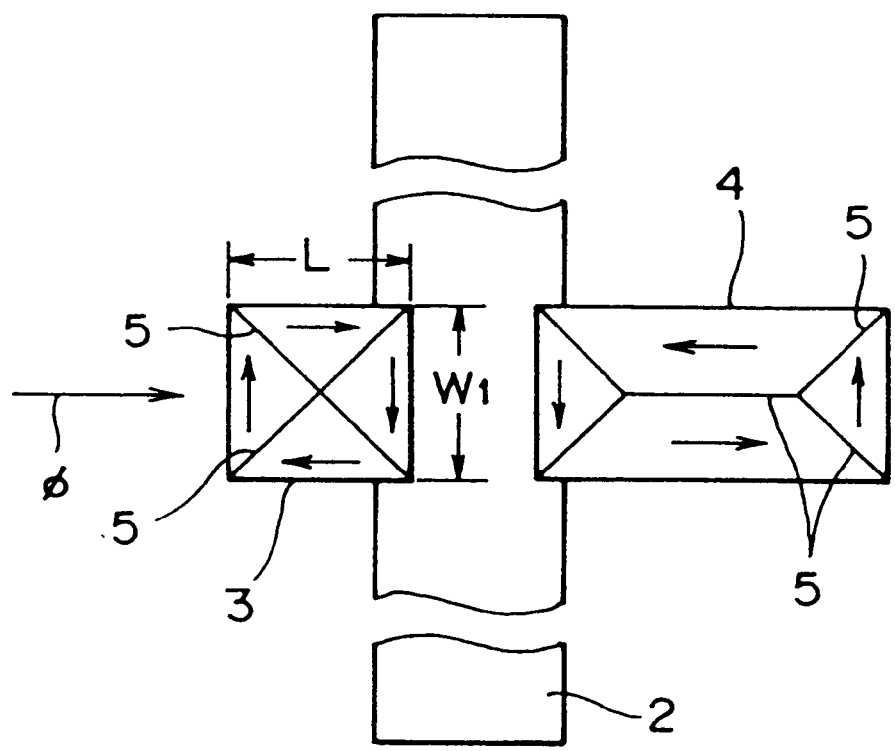
FIG. 29 is a diagram explanatory of problems in a prior art example.

Then, an external magnetic field H greater than 1000 Oe is applied to make the directions of magnetization of the hard magnetic films 60 and 64 identical with each other. FIG. 28B shows a condition where the application of the external magnetic field has been stopped. As shown in FIG. 28C, an external magnetic field H greater than 500 Oe and smaller than 1000 Oe is then applied in the direction opposite to that shown in FIG. 28A to thereby invert the direction of magnetization of only the hard magnetic film 60 formed on the opposite sides of the magnetoresistive element 22'. Then, the application of the external magnetic field is stopped to thereby define the opposite directions of magnetization of the magnetoresistive element 22' and the front flux guide 24' as shown in FIG. 28D.

In the above preferred embodiments described with reference to FIGS. 23A to 27B, the directions of magnetization of the magnetoresistive element and the flux guide are defined as the opposite directions, thereby preventing a reduction in sensitivity of the magnetoresistive element and a reduction in permeability of the flux guide due to magnetic fields generating each other to improve the reproduced output from the MR head.

What is claimed is:

1. A magnetoresistive head for reproducing information recorded on a record medium comprising:

a magnetoresistive element for converting a signal magnetic field leading out from a record track of the record medium into changes in resistance, said magnetoresistive element being set back from a front end face of said head confronting said record medium, said magnetoresistive element having first and second ends;

a pair of terminals connected to said magnetoresistive element and defining a sense region of the magnetoresistive element therebetween, the width of the sense region being narrower than the width of the record track; and a front flux guide having first and second ends, said first front flux guide end being exposed on the front end face of said head and said second front flux guide end being magnetically coupled to said first end of said magnetoresistive element, for guiding magnetic flux from the record medium to said magnetoresistive element;

wherein said front flux guide is generally shaped in the form of a rectangle elongated in a direction of a width of the record track of said record medium so as to exceed the sense region of said magnetoresistive element and the width of the record track of said record medium, and a direction of the easy axis of magnetization of said front flux guide is parallel to the direction of the width of the record track;

said front flux guide further having a projected portion whose exposed front end portion has a width smaller than the width of the record track, and wherein said front flux guide is exposed in the front end face of said head at said projected portion, said projected portion being shaped in a trapezoid defined by said front end portion, two tapering side edges, each side edge having a first side edge end intersecting said front end portion and a second side edge end extending toward said second front flux guide end, and a line defined by connecting both said second side edge ends, wherein said front end portion has a length longer than either of said side edges.

2. A magnetoresistive head according to claim 1, further comprising a back flux guide having first and second ends, said first back flux guide end being magnetically coupled to said second end of said magneto resistive element, wherein said back flux guide is generally shaped in the form of a rectangle elongated in the direction of the width of the record track of said record medium so as to exceed the sense region of the magnetoresistive element, and a direction of easy axis of magnetization of said back flux guide is parallel to the direction of the width of the record track.

3. A magnetoresistive head according to claim 2, further comprising magnetic films deposited over whole surfaces of said front flux guide and said back flux guide, said magnetic films being selected from a group consisting of an antiferromagnetic film, a permanent magnet film, and a ferrimagnetic film.

4. A magnetoresistive head according to claim 2, further comprising magnetic films deposited over surfaces of said front flux guide and back flux guide except portions corresponding to the width of the sense region of said magnetoresistive element, said magnetic films being selected from a group consisting of an antiferromagnetic film, a permanent magnet film, and a ferrimagnetic film.

5. A magnetoresistive head according to claim 2, wherein at least one of said front flux guide and said back flux guide is overlapping with said magnetoresistive element in a direction of the film thickness at least at a portion corresponding to the width of the sense region of said magnetoresistive element.

6. A magnetoresistive head according to claim 1, wherein said exposed front end portion is generally centered on said first end of said front flux guide; and wherein said side edges are arranged to progressively taper from the front end face of said head as said side edges go from said exposed front end portion toward both ends of said front end face.

7. A magnetoresistive head according to claim 1, further comprising a magnetic film deposited over a surface of said front flux guide except a portion corresponding to the width of the sense region of said magnetoresistive element, said magnetic film being selected from a group consisting of an antiferromagnetic film, a permanent magnet film, and a ferrimagnetic film.

8. A magnetoresistive head according to claim 1, further comprising a magnetic film deposited over a surface of said front flux guide except a central portion having a width corresponding to the width of the sense region of said magnetoresistive element and a front edge portion having a predetermined width, said magnetic film being selected from a group consisting of an antiferromagnetic film, a permanent magnet film, and a ferrimagnetic film.

9. A magnetoresistive head according to claim 1, further comprising a magnetic film deposited over a whole surface of said front flux guide except said projected portion, said magnetic film being selected from a group consisting of an antiferromagnetic film, a permanent magnet film, and a ferrimagnetic film.

10. A magnetoresistive head for reproducing information recorded on a record medium comprising:

a magnetoresistive element for converting a signal magnetic field leaking out from a record track of the record medium into changes in resistance, said magnetoresistive element being set back from a front end face of said head confronting said record medium;

a pair of terminals connected to said magnetoresistive element and defining a sense region of the magnetoresistive element therebetween;

a nonmagnetic insulating layer having said magnetoresistive element and said terminals embedded therein;

first and second magnetic shields having said nonmagnetic insulating layer interposed therebetween and defining a gap in a front end face of said head for receiving magnetic flux from the record medium so that a first distance between said first and second magnetic shields, at least in the sense region of said magnetoresistive element, is longer than a second distance therebetween in the front end face of said head, said gap is not used by coils for writing information to a record medium; and a front flux guide, one end thereof being exposed in the front end face of said head and the other end thereof being magnetically coupled to one end of said magnetoresistive element, for guiding magnetic flux received from the record medium through said gap to said magnetoresistive element;

wherein said front flux guide is generally shaped in the form of a rectangle elongated in a direction of the width of the record track of said record medium so as to exceed the sense region of said magnetoresistive element, and a direction of the easy axis of magnetization of said front flux guide is parallel to the direction of the width of the record track, and wherein said first and second magnetic shields further define portions of said shields that are only at locations that oppose said magnetoresistive element and have a boundary corresponding to a boundary of said MR element so that said first distance between said shields is only defined at said portions.

11. A magnetoresistive head according to claim 10, wherein said magnetoresistive element is set closer to said first magnetic shield.

12. A magnetoresistive head according to claim 11, further comprising supply means connected to said pair of terminals for supplying a constant sense current to said magnetoresistive element, wherein said magnetoresistive element is magnetically biased by said first and second magnetic shields magnetized by a magnetic field due to said sense current.

13. A magnetoresistive head according to claim 10, wherein said second magnetic shield is coupled to said first magnetic shield at an end portion opposite to another end portion where said gap is defined, and wherein a distance between said first and second magnetic shields in a middle portion between the another end portion at which the gap is defined and the end portion at which the coupling is made is formed to be larger than a distance at the another end portion where the gap is defined, said magnetoresistive head further comprising:

a conductor coil for recording wound around the end portion at which the coupling is made.

14. A magnetoresistive head according to claim 10, wherein said second shield further includes a first recess facing said magnetoresistive element and said first distance extends from said first recess to said first shield.

15. A magnetoresistive head according to claim 14, wherein said first shield flirter includes a second recess, and said first distance extends from said first recess to said second recess.

* * * * *

UNITED STATES PATENT AND TRADEMARK OFFICE
CERTIFICATE OF CORRECTION

PATENT NO. : 5,995,339
DATED : November 30, 1999
INVENTOR(S) : Koshikawa et al.

It is certified that error appears in the above-indentified patent and that said Letters Patent is hereby corrected as shown below:

On the Face of the Patent:

Under "[56] References Cited, Foreign Patent Documents", delete "5-114119 7/1993 Japan" and insert --5-114119 5/1993 Japan-- therefor Claim 15, line 2, delete "flirter" and insert --further-- therefor Signed and Sealed this Tenth Day of April, 2001

Attest:

NICHOLAS P. GODICI

Attesting Officer     *Acting Director of the United States Patent and Trademark Office*